(12) United States Patent
Nishi et al.

(10) Patent No.: US 7,030,956 B2
(45) Date of Patent: *Apr. 18, 2006

(54) OPTICAL INTENSITY MODULATION METHOD AND SYSTEM, AND OPTICAL STATE MODULATION APPARATUS

(75) Inventors: Tomohiro Nishi, Kanagawa (JP); Michihiro Ohnishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 352 days.

This patent is subject to a terminal disclaimer.

(21) Appl. No.: 10/385,225

(22) Filed: Mar. 10, 2003

(65) Prior Publication Data

US 2003/0169281 A1 Sep. 11, 2003

(30) Foreign Application Priority Data

Mar. 11, 2002 (JP) .............................. P2002-066049

(51) Int. Cl.
G03B 21/32 (2006.01)
H04N 7/167 (2006.01)
G02B 26/00 (2006.01)

(52) U.S. Cl. .......................... 352/85; 352/40; 380/200; 359/238

(58) Field of Classification Search .................. 352/38, 352/40, 85; 380/200, 201, 252; 359/237, 359/238; 348/744, 750, 755
See application file for complete search history.

(56) References Cited

U.S. PATENT DOCUMENTS

| 5,680,454 | A | * | 10/1997 | Mead | 380/204 |
| 6,529,600 | B1 | * | 3/2003 | Epstein et al. | 380/252 |
| 6,674,561 | B1 | * | 1/2004 | Ohnishi et al. | 359/238 |
| 2002/0168069 | A1 | * | 11/2002 | Tehranchi et al. | 380/235 |
| 2004/0150794 | A1 | * | 8/2004 | Kurtz et al. | 353/31 |

FOREIGN PATENT DOCUMENTS

| EP | 1 237 369 | 9/2002 |
| EP | 1 294 189 | 3/2003 |
| EP | 1 301 034 | 4/2003 |
| WO | WO 01 33846 | 5/2001 |
| WO | WO 01 56279 | 8/2001 |

* cited by examiner

Primary Examiner—Rodney Fuller
(74) Attorney, Agent, or Firm—Frommer Lawrence & Haug LLP; William S. Frommer; Thomas F. Presson

(57) ABSTRACT

An optical intensity modulation having a periodicity in the temporal domain is applied on an optical state of an original display image, being displayed on a projection screen or a display screen, that takes into account a human temporal frequency contrast sensitivity characteristics, so that an optical state variation that is independent of the original display image would appear in an image recorded by capturing the display image using an image capturing apparatus, while the optical state variation in the display image being directly viewed remains imperceptible.

11 Claims, 27 Drawing Sheets

THE Y AXIS REPRESENTS THE RATIO OF RECORDED LUMINANCE
AGAINST DISPLAYED LUMINANCE, WHITCH IS A(1-α).
THE HORIZONTAL AXIS REPRESENTS FRAMES WITH 60 FRAMES PER SECOND.

F I G. 3
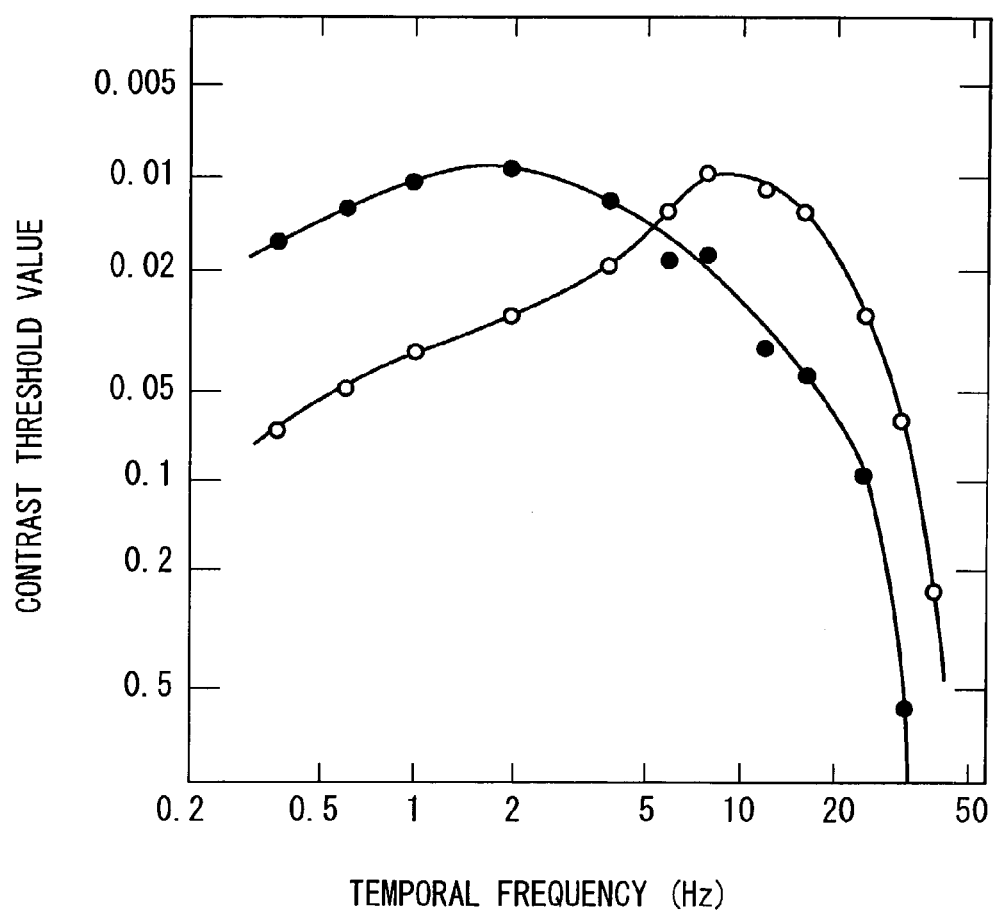

F I G. 1 2
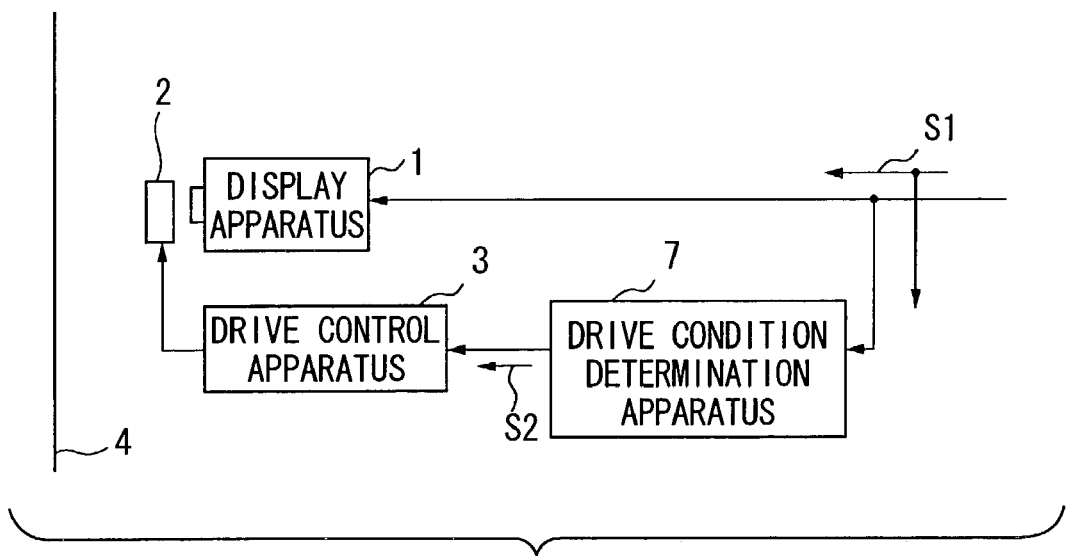

(A) SIGNAL AMPLITUDE

1 FRAME (B) SIGNAL AMPLITUDE

1 FRAME

F I G. 1 8
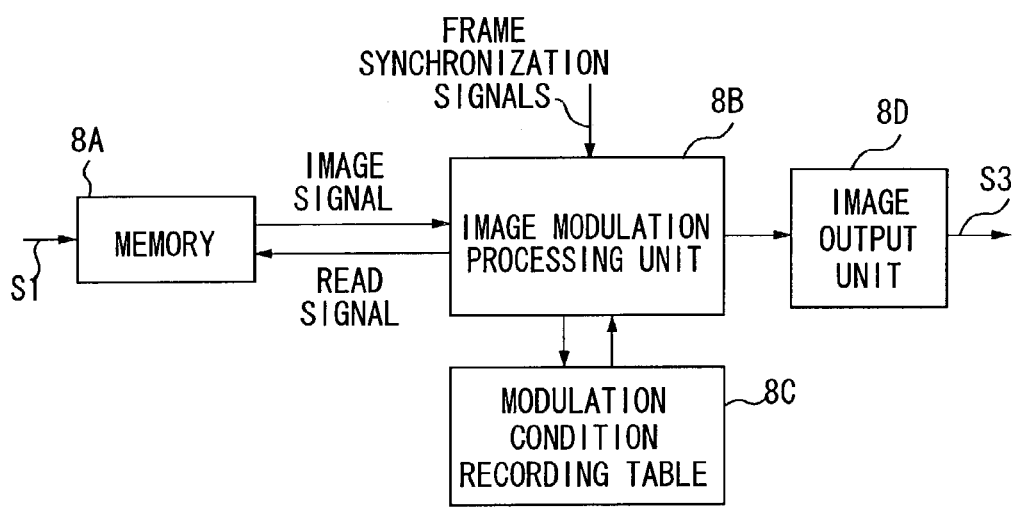

F I G. 2 5
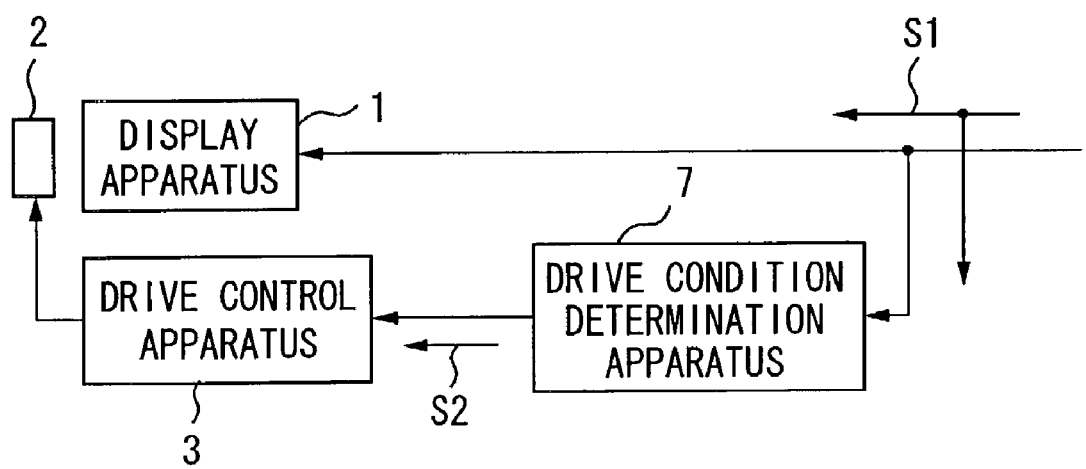

F I G. 2 8
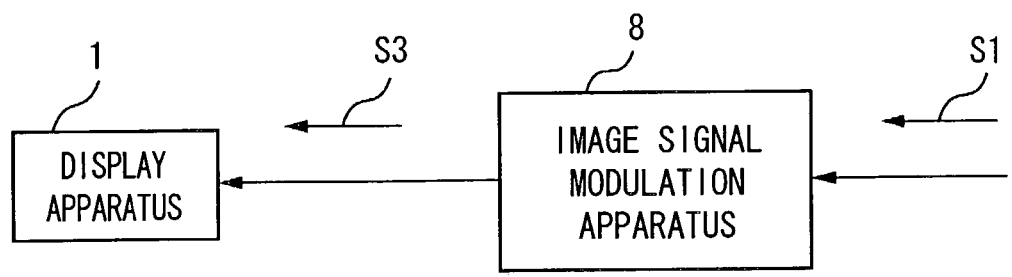

OPTICAL INTENSITY MODULATION METHOD AND SYSTEM, AND OPTICAL STATE MODULATION APPARATUS

RELATED APPLICATION DATA

This application claims priority to Japanese Patent Application JP 2002-066049 filed in Japanese Patent Office on Mar. 11, 2002, and the disclosure of that application is incorporated herein by reference to the extent permitted by law.

BACKGROUND OF THE INVENTION

1. Field of the Invention

The present invention relates to a technology for applying an optical intensity modulation on an image displayed on a display screen so as to generate an optical state variation that is visible in a recorded image obtained through unauthorized image-capturing of the displayed image and interferes with a viewing of the recorded image.

2. Description of the Related Art

A technology for preventing unauthorized recording of an image displayed on a display screen (image/video piracy) is disclosed in U.S. Pat. No. 6,018,374. In the related art disclosed in U.S. Pat. No. 6,018,374, difference of imaging characteristics between human vision and an image-capturing apparatus such as camera is considered, and infrared light is utilized as a means for preventing image/video piracy. Specifically, the related art employs a system in which infrared light projector is placed in a vicinity of an image projector or any other position far from the screen. In the system, infrared light is projected from an infrared light projector to the screen so that infrared light reflected at the screen can fall upon the image-capturing apparatus operated by a person conducting image/video piracy. In other words, the technology enables to record an infrared image unrelated to a feature film/video program image when image/video piracy is conducted. Accordingly, quality of the recorded image obtained through image/video piracy can be damaged, and even a location at which image/video piracy has been conducted may be identified. Of course, audience/spectator/viewer (referred as audience hereafter) directly viewing a feature film/video image can enjoy it without any difficulty since infrared light cannot be perceived by the human vision.

SUMMARY OF THE INVENTION

As described above, sufficient prevention and interfering effect may be accomplished by utilizing infrared light. However, it is desirable to establish a variety of prevention and/or interfering technologies for protecting valuable image/video contents.

According to an embodiment of the present invention, there is provided a technology for applying an optical intensity modulation having a periodicity in temporal domain on optical state of an original display image so that, without interfering the direct viewing of a displayed image, an optical state variation independent of the original display image can be perceived in a recorded image obtained by image-capturing of the displayed image using an image-capturing apparatus. More specifically, a modulation technology is provided for generating interfering noise (optical state variation independent of the original display image) that becomes visible when the recorded image, which is obtained by an imaging apparatus or the like, is viewed but remains invisible or almost invisible when the displayed image is viewed directly without using any imaging apparatus or the like.

The optical state variation may include a variation in light-and-dark contrast domain (luminance variation), a variation in color domain, and/or a combination of these variations. In the following section of the present specification, conditions enabling such optical state variations and application examples utilizing the above-mentioned modulation technology will be described.

BRIEF DESCRIPTION OF THE DRAWINGS

The features and advantages of the present invention will become more apparent in the following description of the presently preferred exemplary embodiments of the invention taken in conjunction with the accompanying drawings, in which:

FIG. 3 is a graph showing a contrast sensitivity characteristic of human vision as a function of temporal frequency for different color states;

FIG. 12 shows a configuration example of a projection system (of a projection light modulation type);

FIG. 18 shows a configuration example of an image signal modulation apparatus;

FIG. 25 shows a configuration example of a direct view system (of a display light modulation type);

FIG. 28 shows a configuration example of a direct view system (of an image signal modulation type)

DESCRIPTION OF THE PREFERRED EMBODIMENTS (A) Basic Principle (A-1) Human Visual Characteristic on Contrast Variation In one embodiment of the present invention, the focus is placed on human visual characteristic in perceiving optical flickering. Temporal frequency contrast sensitivity of the human vision can be obtained by calculating a Michelson contrast (just called "contrast" hereafter) for various temporal frequencies, where the Michelson contrast is a contrast at which the human vision system can no longer perceive the flicker of light that is being modulated in sinusoidal fashion in temporal domain.

Figure 1:
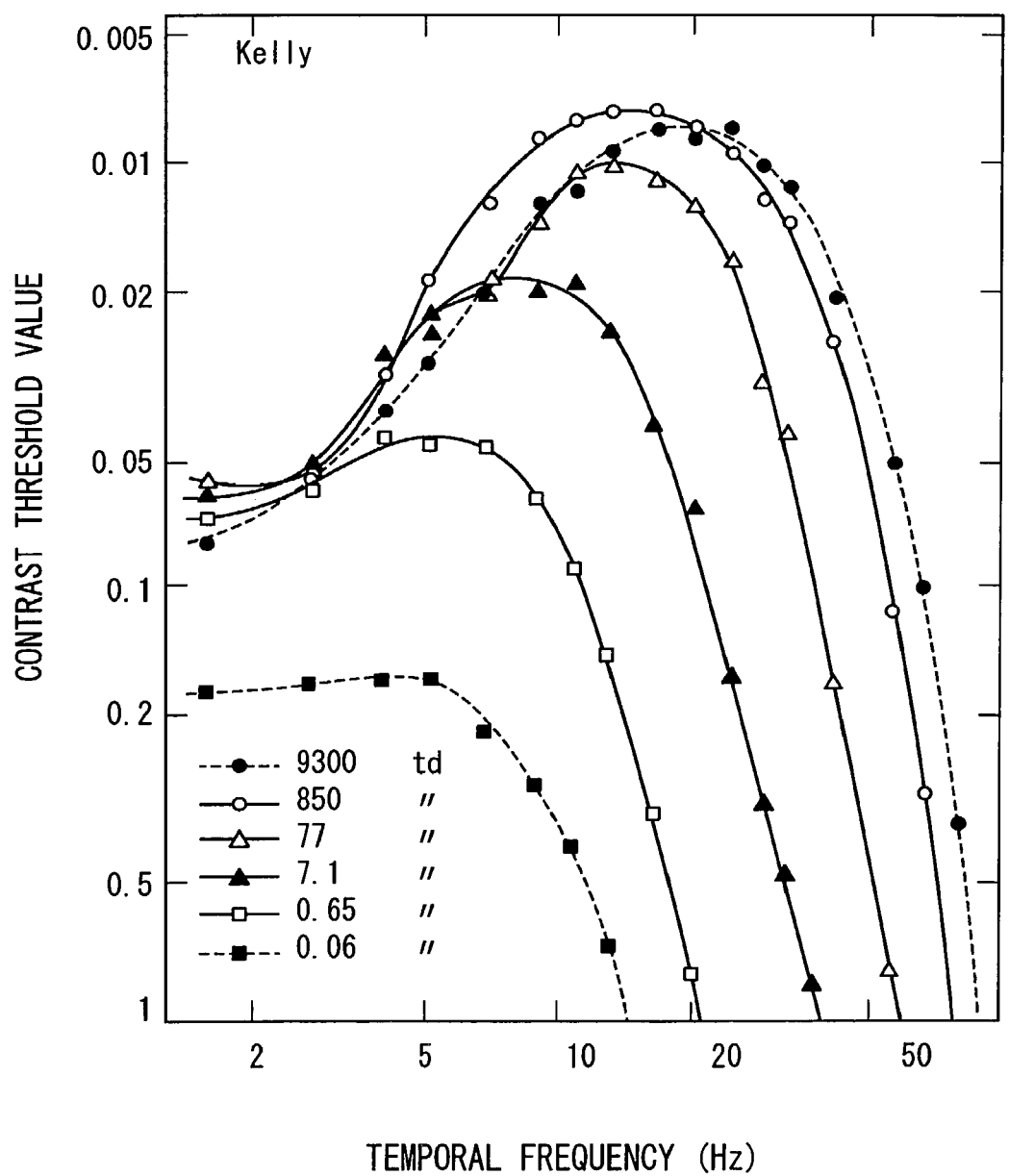
FIG. 1 is a graph showing a contrast sensitivity characteristic of human vision as a function of temporal frequency for various average luminance.

FIG. 1 is a graph showing the contrast sensitivity of human vision as a function of temporal frequency for various average luminance. That is, FIG. 1 shows experimental results measured in various conditions to determine visibility of the flicker on a display screen when displays of light-dark are repeated thereon. The contrast scaled at the vertical axis of the graph is the value of an amplitude divided by an average luminance, and specifically calculated by (Max−Min)/(Max+Min), where Max and Min are the maximum value and the minimum value of the amplitude, respectively. The temporal frequency scaled at the horizontal axis corresponds to a frequency of the light-dark (contrast) variation. Legend symbols in the figure such as ○ and ●, respectively, indicate corresponding groups of the measured results for different average luminance of the display screen.

In the figure, the average luminance level is called a retina illuminance and may be expressed with a unit Troland (td). The unit corresponds to the luminous level at a retina of the human vision. In other words, the unit "td" corresponds to the value multiplying an area of pupil (mm$^2$) by luminance (cd/m$^2$). 1000 td corresponds to approximately 40 nit, where a unit "nit" corresponds to the luminance (cd/m$^2$).

Each curve line passing through the same symbols in FIG. 1: indicates a threshold boundary up to which the flicker of corresponding average luminance can be perceived by the human vision. The flicker can be perceived at a region below the threshold boundary curve line (region corresponding to contrast sensitivities equal or more than the temporal frequency contrast sensitivity of the human vision). The flicker cannot be perceived at a region above the boundary curve line (region corresponding to contrast sensitivities less than the temporal frequency contrast sensitivity of the human vision).

As shown in FIG. 1, the human vision sensitivity for the flicker peaks at 10–20 Hz, at which frequency a small change in the contrast would be perceived more easily. Lager contrast variation is required for the flicker to be perceived at frequencies higher than the above peak range. For example, the flicker can no longer be perceived when the average luminance of 77 td, even with a contrast variation of 10% at about 50 Hz. Instead, a light with a constant luminance, that is a temporal average of the flickering variation, would be observed.

The above-mentioned human vision characteristic is exploited in display apparatuses such as a film movie projector which uses a frame frequency of 48 Hz and a TV receiver with a CRT display which uses a display frame frequency of 60 Hz, thereby displaying an image without any flicker.

(A-2) Modulation Condition (A-2-1) Modulation Condition Causing Human Vision to Perceive no Flicker when Display is Viewed Directly First, a modulation condition is obtained under which the flicker would not be perceived by the human vision when a display screen is viewed directly. In order to obtain a basic condition to be satisfied in a modulation method of the present embodiment, a modulation of a sinusoidal waveform is applied on an image having a uniform luminance displayed on the display screen in the present example. In other words, a periodic optical intensity modulation is applied on the displayed image in the present example.

The optical state over time of the displayed image on which the optical intensity modulation is applied is described by the following function F(f,t) at time t:

$$F(f,t)=A\times(1-\alpha)+\alpha A\times\cos(2\pi ft) \quad \text{(Equation 1)}$$

where A is a constant, f is a frequency of the modulation, α is a contrast (1≧α≧0) and t is a time.

The first term of the Equation 1 represents the average luminance of the displayed image, and the second term represents a temporal modulation component to be added to the first term. Accordingly, the flickering in the displayed image would not be perceivable, as explained in the section (A-1), if an amplitude of the temporal modulation (αA) is set to a value less than or equal to the amplitude, at which the flicker of the particular temporal modulation frequency f would no longer be perceivable, according to a calculation based on the temporal frequency contrast sensitivity of the human vision at the luminance level in the displayed image. Consequently, the human vision only perceives the displayed image having a constant luminance, represented as A×(1−α), on the display screen.

For example, when the modulation described above is applied on a movie being shown in a movie theater, the luminance-modulated light of a contrast of α=20% and a temporal frequency of f=72 Hz needs to be applied on the displayed image projected onto a screen, if the displayed image is a completely white screen of 40 nit, which corresponds to approximately 1000 td and a maximum luminance of a film image displayed at a rate of 24 frames/second.

As described in the following, a variety of methods may be utilized for applying the optical intensity modulation. One of such methods is to use a rotation filter that includes a rotate-able filter part having a sinusoidal density variation. The rotation filter is placed in front of a projector lens of a projection type display apparatus (i.e. projector) or any other position along the projection optical path, and its filter part, through which the projection light is transmitted, is being rotated.

In the present example, the sinusoidal modulation with a temporal frequency of 72 Hz and a contrast of 20% is applied on the displayed image. This condition corresponds to the frequency and amplitude condition equal or less than that of the temporal frequency contrast sensitivity of the human vision. Accordingly, no flicker is perceived by a person who is directly viewing the displayed image projected on the screen.

With the present method, the average luminance goes down because of the rotation filter. Specifically, in the present example the average luminance would be $A(1-\alpha)$ or $40 \times (1-0.2)$ or 80% of the original average luminance A. Consequently, the optical state of the displayed image projected onto the screen would remain the same as the original luminance of 40 nit, if the maximum luminance of the displayed image were multiplied in advance by an inverse of $(1-\alpha)$, which is a reduction ratio by which the luminance goes down, and corrected to 50 nit.

The adjustment of the luminance may be accomplished with an image luminance adjustment unit/circuitry. The image luminance adjustment unit/circuitry calculates the above-mentioned reduction ratio based on the contrast information that is stored or being fed from outside, and adjusts an optical source luminance according to the calculated reduction ratio. Alternatively, the image luminance adjustment unit/circuitry may adjust an optical source luminance according to the reduction ratio that is stored or being fed from outside.

The applicability of the method of applying the optical intensity modulation on the displayed image while generating no visible flicker for the audience is not limited to images displayed with a same average luminance on the entire area of the display screen (e.g. all white screen). The same method may also be applied on a more typical image that has different levels of average luminance at various parts of the image.

In the present embodiment, it is not necessary to apply the optical intensity modulation on the entire area of the screen at once. For example, the phase of the optical intensity modulation may be varied at various positions (spatial positions) in the displayed image. Furthermore, different optical intensity modulation (different combinations of amplitude and frequency) may be applied on different positions (spatial positions) in the displayed image. As described above, the optical intensity modulation information may be superimposed without presenting visible flicker to the audience of the displayed image. Of course, such optical intensity modulation method can be similarly utilized for an optical intensity modulation satisfying another condition that will be described in the following sections when the optical intensity modulation is applied on the displayed image.

Furthermore, in the present embodiment, the maximum luminance of the displayed image may be defined independently for different image scenes. For example, an image scene having a lower maximum luminance may be subject to the optical intensity modulation (combination of amplitude and frequency) according to the lower maximum luminance, and an image scene having a higher maximum luminance may be subject to the optical intensity modulation (combination of amplitude and frequency) according to the higher maximum luminance.

As shown in FIG. 1, the contrast threshold does not vary significantly even when the luminance of the displayed image varies greatly. For example, when the average luminance changes from 850 td to 77 td, the corresponding contrast sensitivity curve only shifts from a characteristic curve represented by the symbol ○ to a characteristic curve represented by a symbol Δ. Furthermore, the higher the average luminance, the easier it is for the human vision to distinguish the contrast variation. In practice, the modulation condition can be determined satisfactorily based on the maximum luminance (all white screen) for all of the image scenes throughout a feature film/video program to be viewed or watched.

The present embodiment has been described with the examples utilizing a sinusoidal waveform for the optical intensity modulation. Alternatively, other types of the optical intensity modulation may be used for varying the optical state of the displayed image. For example, other modulation waveforms (composite waveforms), such as a rectangular waves and pulse waves, may be utilized for the optical intensity modulation of the display image. In such a example, the above described condition needs to be satisfied by each of the sinusoidal wave components obtained through a spectral analysis utilizing, for example, a Fourier transformation performed on the modulation wave (composite wave) used for generating the optical intensity modulation. That is, the above described condition needs to be satisfied in the amplitude of each sinusoidal wave component at each frequency.

Although no lower limit is defined for the amplitude of the sinusoidal waveform in the above described examples, the amplitude should preferably be greater than or equal to the increment threshold of human contrast perception. More specifically, this condition should be satisfied to ensure that the contrast variation in the displayed image would be recorded by the image-capturing apparatus.

The increment threshold of human contrast perception is defined as the minimum luminance difference that would be perceived as a contrast difference by a viewer watching an indicator in a lit background. The increment threshold of human contrast perception is a perceptible contrast difference when the luminance is constant (still state) and not modulating (dynamic state). When certain prescribed conditions are satisfied, the human vision system would not be able to perceive a change in the contrast, even if the contrast $\alpha$ were 100% during the optical intensity modulation.

The minimum sinusoidal waveform amplitude should be greater than or equal to the increment threshold of human contrast perception at the particular luminance level in the displayed image, because the sensitivity exhibited by an image-capturing apparatus, such as a video camera or a camcorder, in differentiating the luminance is not much different from the increment threshold of human contrast perception. Therefore, recording of the contrast difference by the image-capturing apparatus can be ensured, if the optical intensity modulation amplitude were greater than or equal to the increment threshold of human contrast perception.

If the sensitivity in differentiating the luminance exhibited by the video camera apparatus or any other image-capturing apparatus, that may be used for image/video piracy, is higher than the increment threshold of human contrast perception, the above mentioned minimum amplitude conditions should be determined based on the image-capturing characteristic of such video camera apparatus or any other image-capturing apparatus.

(A-2-2) Method for Generating Contrast Variation to Interfere with Viewing of Recorded Image Obtained by Image-capturing Conditions required for generating contrast variation on a recorded image is described in the following section.

An image-capturing apparatus, such as a video camera or a camcorder, captures images periodically. For example, images are recorded at a frequency of 60 Hz in a video camera based on the NTSC standard and at a frequency of 50 Hz with the PAL standard. The captured image corresponds to a luminous flux (optical volume) coming into the image-capturing apparatus and integrated over a period of time over which a shutter in the image-capturing apparatus stays open for each frame.

The integrated value for the recorded luminance in each frame may be calculated with the following integral equation, when the luminance-modulated display image (i.e. displayed image) is captured, provided that an optical state variation of the displayed image can be expressed with the above-mentioned function F(f,t).

$$R(Nr) = \int_{Nr/Sr}^{Nr/Sr+Tr} F(f, t)dt \qquad \text{(Equation 2)}$$

where R(Nr) is the recording luminance at frame Nr, Nr is the number of camera frames (Nr=0, 1, 2, ... ), F(f,t) is the recording luminance of the displayed image to which the optical state at time t is applied, Sr is a sampling rate of the image-capturing apparatus, and Tr is a shutter speed of the image-capturing apparatus.

By substituting Equation 2 into the Equation 1 above, the following Equation 3 is obtained.

$$R(Nr)=A(1+\alpha)Tr+(\alpha A/2\pi f)\{ \sin(2\pi f(Nr/Sr+Tr))-\sin(2\pi f(Nr/Sr))\} \qquad \text{(Equation 3)}$$

where Nr=0, 1, 2, . . .

The first term in Equation 3 represents the average luminance of the recorded image, and the second term indicates a temporal modulation component to be added to the first term. As indicated in Equation 3, the amplitude and temporal frequency of the luminance variation for each image-captured frame are determined by the parameters of the optical intensity modulation, such as frequency f and contrast α, and by the characteristics of the video camera (image-capturing apparatus) being used, such as a sampling rate Sr and a shutter speed Tr.

The sampling rate Sr and the shutter speed Tr are the values determined by the image-capturing apparatus being used for image/video piracy. Once these values are determined, only the frequency f and the contrast α need to be determined in such a way that the basic frequency and amplitude for R(Nr) would be values corresponding to a contrast greater than or equal to the temporal frequency contrast sensitivity of the human vision corresponding to the luminance of the displayed image.

In this example, the flicker would be perceived by the human vision in the recorded image obtained through image-capturing of the modulated display images and, thereby, enabling the interference with the viewing of the recorded image.

Accordingly, by appropriately selecting the frequency f and the contrast α of the optical intensity modulation so as to satisfy the conditions defined in the previous Section (A-2-1) and the present Section (A-2-2), no flicker would be perceived when the display screen is viewed directly, while the flicker would be perceived when the recorded image is viewed.

Alternatively, the condition described in the previous section (A-2-1) may be waived, and only the condition described in the present section (A-2-2) should be satisfied in order to interfere with the viewing of the recorded image obtained by piracy, if a less than the highest quality image can be tolerated, as long as the flicker does not interfere too severely with the enjoyment of the image viewed directly.

Figure 2:
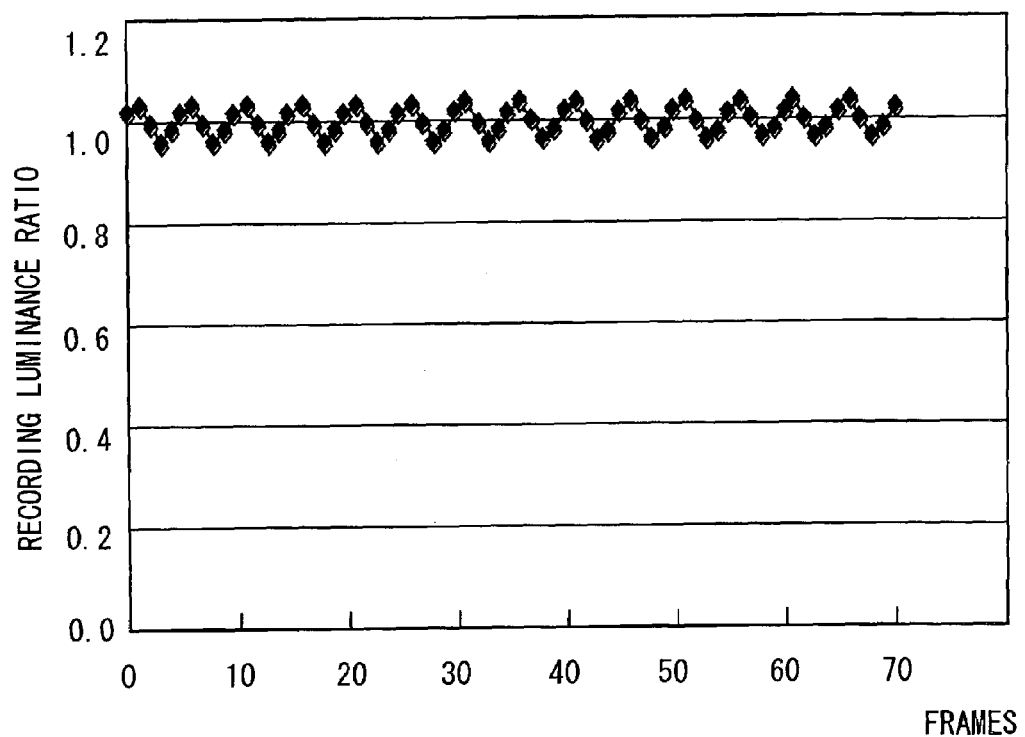
FIG. 2 is a graph showing an example of recording luminance appeared on the recorded image.

Next, the present embodiment will now be described in detail with specific examples. In the following examples, it is assumed that the recorded image is obtained by image-capturing of the displayed image, on which the optical intensity modulation described above is applied, using a standard NTSC video camera. FIG. 2 shows changes in recording luminance after image-capturing, when a shutter opening period is set to 1/60 of a second. The shutter opening for 1/60 of a second is a typical setting for an automatic shutter function used for the image-capturing, performed in a dark movie theater as a movie is shown.

FIG. 2 indicates that the optical intensity modulation with the contrast α of 3% and the base frequency f of 12 Hz is recorded by the video camera. The contrast variation in the captured image (recorded image) is at a higher level than the temporal frequency contrast sensitivity of the human vision, as shown in FIG. 1. Accordingly, the flicker in the recorded image is perceived by the human vision, and the viewing of the recorded image is interfered with. That is, the flicker is perceived only by the audience of the recorded image and not by the audience of the displayed image and, thereby, realizes an interfering effect against image/video piracy.

The interfering effect is maximized when the shutter speed and the sampling rate of the image-capturing apparatus being used coincide with the respective values assumed in advance. If a different combination of shutter speed and sampling rate were used for image-capturing, the amount of flicker in the recorded image may decrease in some cases. For example, if the product of f and Tr were set at an integer number in Equation 3, the flicker can be eliminated.

However, a complicated apparatus would be required to perform a fine adjustment in the shutter speed and the sampling rate. The fine adjustment may not be required for a typical case of image/video piracy. Alternatively, it would be possible to generate the flicker in the recorded image, that is independent of the shutter speed and/or the sampling rate of the image-capturing apparatus, if the frequency and/or amplitude of the optical intensity modulation were changed in the course of the display.

In the above described examples, the sinusoidal waveform is used for generating the optical intensity modulation. Alternatively, a modulation based on any other waveform may also be utilized to accomplish a similar effect. If a composite wave/pulse form were used for the modulation, the conditions of the present section (A-2-2) and the previous section (A-2-1) would need to be satisfied by at least one of the sinusoidal wave components of the composite wave/pulse in order to generate the visible flicker in the recorded image by applying the optical intensity modulation on the displayed image, while generating no visible flicker for the audience, directly viewing the displayed image. The sinusoidal wave components of the composite wave/pulse may be obtained through a spectral analysis by, for example, Fourier transformation performed on the composite wave/pulse. If the highest image quality were not required for the displayed image that is viewed directly by the audience, it may not be necessary to completely satisfy the condition mentioned in the previous section (A-2-1).

(A-2-3) Maintaining Display Luminance Before and After Luminance Modulation

An additional condition will now be described. The condition described herein is one of conditions to be satisfied to alleviate a sense of discomfort when the audience is viewing the displayed image. When the optical intensity modulation satisfying the conditions described above is applied on the display image (image to be displayed) so as to accomplish a desired interfering effect, there is a chance that a display luminance that is different from the original display image may be presented due to a mismatch between the frequency of the optical intensity modulation and the frequency of the displaying system in use. That is, the display luminance (optical state) in the frame may be different before and after the optical intensity modulation is applied. Here, the display luminance refers to an averaged luminance over a period of one frame.

Typically, the audience may not notice such a change in the display luminance, since the audience has no prior knowledge of what the original display luminance should be. However, the display luminance change may become an issue in some cases. For example, the change in the display luminance may become a problem when a highly artistic image is displayed.

In such a case, it would be necessary to keep the luminance unchanged in each frame of the display image, even after the optical intensity modulation is applied. The following equation has to be satisfied in order to maintain the same display luminance.

$$I(Np) = \int_{Np \times Tp}^{(Np+1) \times Tp} F(f, t) dt \quad \text{(Equation 4)}$$

where I(Np) is the original display luminance before the optical intensity modulation is applied on a frame Np in the display apparatus in use. Here, Np=0, 1, 2, . . . , and Tp is a time period for one frame in the display apparatus in use.

The same image as the one without the optical intensity modulation can be displayed if the optical intensity modulation F(f,t) is designed to satisfy the condition of the present section (A-2-3) as well as the conditions of the previous sections (A-2-1) and (A-2-2). Incidentally, the condition defined by Equation 4 is already satisfied by the particular example described in the section (A-2-1) (the image frequency is set at 24 Hz, luminance in a single frame before the optical intensity modulation is applied is constant, and a sinusoidal wave at 72 Hz is used for the optical intensity modulation). A optical intensity modulation that only interfered with the recorded image may be realized without generating the flicker visible to the audience or causing any modification in the display image.

(A-3) Human Visual Characteristic with Respect to Color Variation

In one embodiment of the present invention, the focus is placed on human visual characteristic with respect to color variation. In this section, it will be shown that a similar effect as in the previous embodiment, in which the optical state was varied in luminance, may be realized by varying the optical state in color domain.

The optical state variation may also be realized by modulating a spectral distribution (color components) even as the luminance remains the same as in the original display image. For example, when the modulation is performed in such a way that a red light of 100 nit and a green light of 100 nit are displayed alternatively with the modulation frequency set at approximately 70 Hz, the human vision cannot separate the two colors and perceives only a mixture of these colors. Namely, no color variation would be visible to the audience who is directly viewing the displayed image.

However, when the displayed image is image-captured by an image-capturing apparatus with a sampling rate of 60 Hz, time periods over which the red light is displayed and the green light is displayed in a single frame would be different in the recording. As a result, a color variation between the red and green at a lower modulation frequency (10 Hz in the present example) would be visible in the recorded image and, thereby, realize an interfering effect that relies on an optical state variation in the color domain.

A specific example will now be described. FIG. 3 shows the contrast sensitivity of human vision with respect to a color variation as a function of temporal frequency. In FIG. 3, an area above a characteristic curve (where the contrast variation is smaller) represents the contrast values at which the human vision is unable to perceive the change, and an area below the characteristic curve (where the contrast variation is larger) represents the contrast values at which the human vision can perceive the change.

Figure 4:
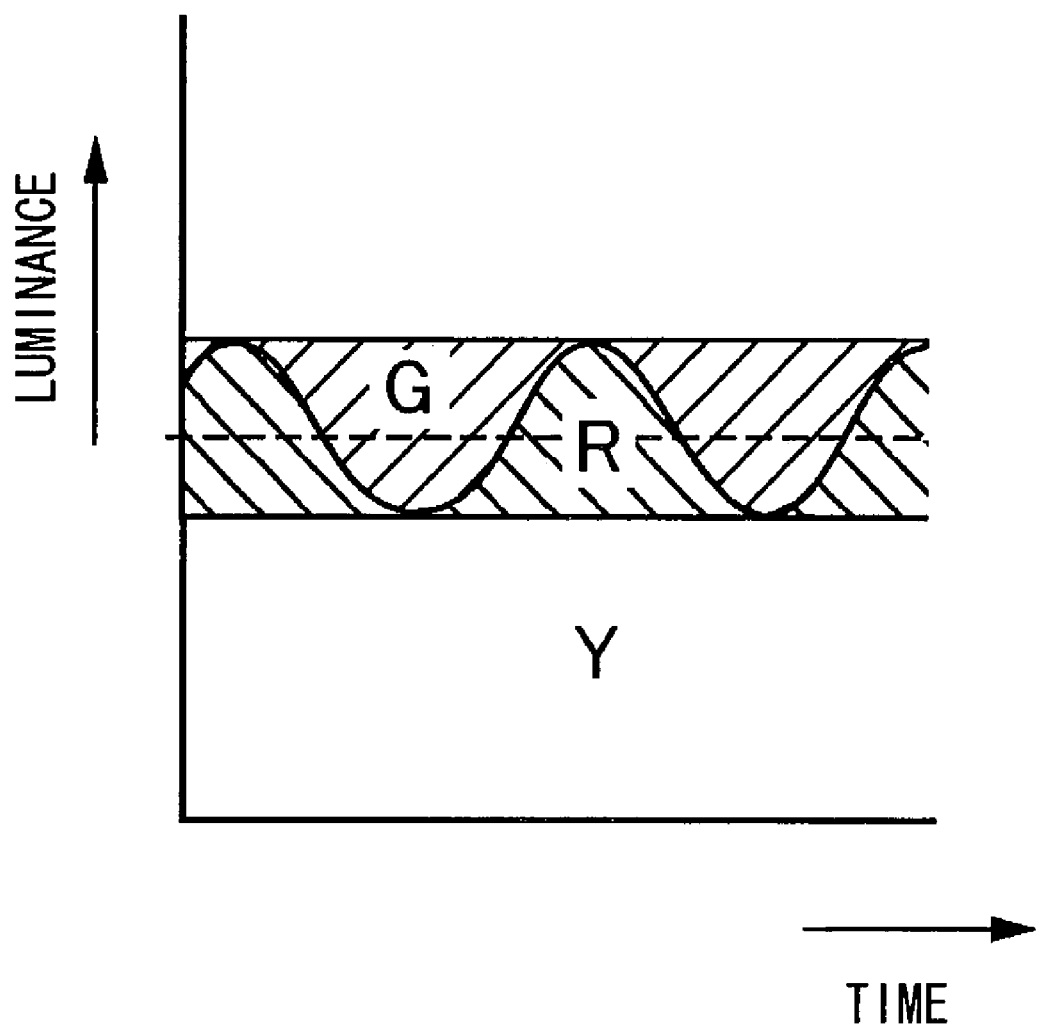
FIG. 4 shows an example of an optical state modulation application in which a sum of luminance values of two different colors is constant and the luminance values for two different colors vary and have opposing phases from each other.

The characteristic curve with the symbol ●, shown in FIG. 3, represents the sensitivity characteristic for the green light (G) and the red light (R) modulated in opposing phases, so that a combined luminance of the two colored light beams would be constant, as shown in FIG. 4. Incidentally, a letter Y, shown in FIG. 4, indicates a yellow light. FIG. 4 shows how the mixture of the green light (G) and the red light (R) would look in a typical case.

When such a modulation is applied on the image being displayed, while the modulated image that is being displayed is recorded by an image-capturing apparatus, a varying pattern of colors, changing from red to green and green to red, would become visible, although no luminance (corresponding to the contrast) variation would be visible in the recorded image.

Of course, conditions (amplitude and frequency) for the optical intensity modulation to be applied with each color may be determined in the same way as the contrast variation described in the previous sections. The optical intensity modulation condition for each color is preferably selected in such a way that the selected optical intensity modulation would fall into an area in FIG. 3, in which the color variation would not be detected, when the displayed image is viewed directly, and into the other area in FIG. 3, in which the color variation would be detected in the recorded image captured by the image-capturing apparatus.

In the present embodiment, the luminance for the color mixture does not need to remain exactly the same after the optical intensity modulation is applied, as long as no interfering effect is perceived by the audience that is directly viewing the displayed image. Obviously, an appropriate condition should be selected for maintaining the same luminance value before and after the modulation, whenever necessary. The similar rationale as described in the previous sections (A-2-1) to (A-2-3) may apply in the selection of such conditions.

Figure 5:
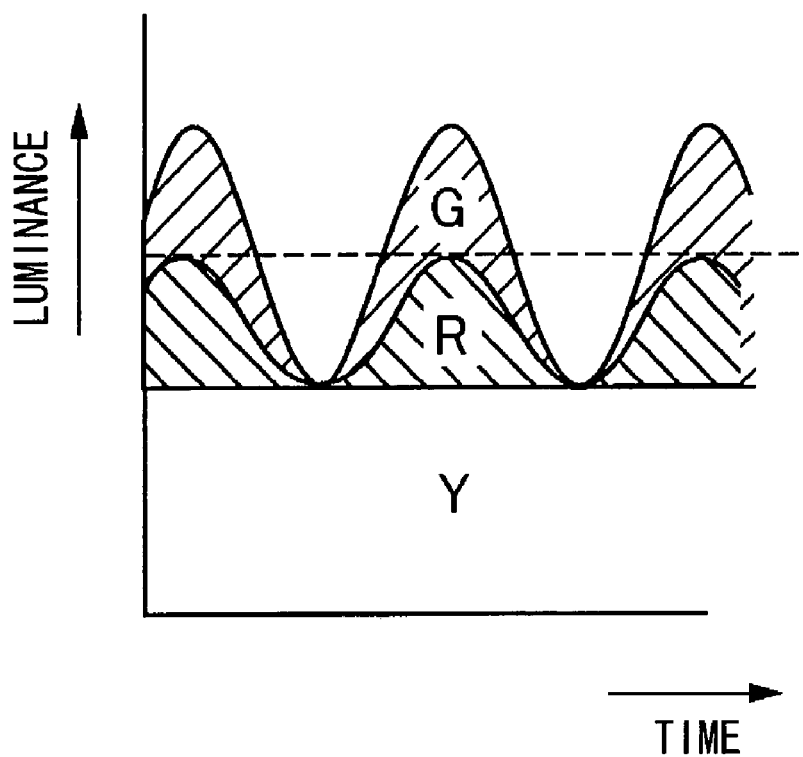
FIG. 5 shows an example of an optical intensity modulation application in which the luminance values for two different colors vary but have the same phase.

A characteristic curve with a symbol ○ is also shown in FIG. 3 for a green light (G) and a red light (R) modulated with synchronized phases, as shown in FIG. 5. In this case, a color component ratio between the green light (G) and the red light (R) remains constant, and only the luminance (light-dark contrast) changes without a color change. In other words, the contrast modulation described in the previous sections may be realized not only by the luminance variation but also by the color variation.

A comparison of the two characteristic curves in FIG. 3 shows a difference temporal frequency characteristics. FIG. 3 indicates that a contrast variation (represented by the characteristic curve with the symbol ○) is perceived more easily by the human vision than a color variation (represented by the characteristic curve with the symbol ●) at a higher frequency. In other words, a color variation is less visible than a contrast variation at a higher frequency. It means that an optical state variation in color would provide an effect of more practical use than an optical state variation in contrast at a lower frequency. Therefore, the optical state variation in color would be more readily usable in practical applications, compared with the contrast variation.

(A-4) Other Modulation Methods

As mentioned above, desired effects of the present invention may be accomplished by the optical state variation in both contrast domain and color domain. In such optical state variation, the frequency of the optical intensity modulation to be applied does not need to be a constant.

For example, a specific meaning may be assigned to a particular temporal frequency of the optical intensity modulation so as to provide information on the location and date/time of the display. Alternatively, if a specific meaning is assigned to a particular rule of temporal frequency change (for example a sequential order of the change), the information relating to the display may also be provided by the way the temporal frequency of the optical intensity modulation changes. Furthermore, a specific meaning may also be assigned to the contrast (light-dark or color) itself or to the way the contrast changes.

Such information may be provided, for example, by providing a memory that stores the information relating to the display and the corresponding optical intensity modulation (combinations of temporal frequency and contrast), receiving information relating to the display inputted through an input device, and reading out the corresponding type of the optical intensity modulation based on the inputted information.

Alternatively, the optical intensity modulation may be applied only on a part (spatial position) of the display image. By utilizing such partial application of the optical intensity modulation, the information relating to the display such as location and date/time of the display may also be provided. The type of the optical intensity modulation corresponding to the information relating to the display can be read out by employing the similar system as that of the previous sections.

Figure 6:
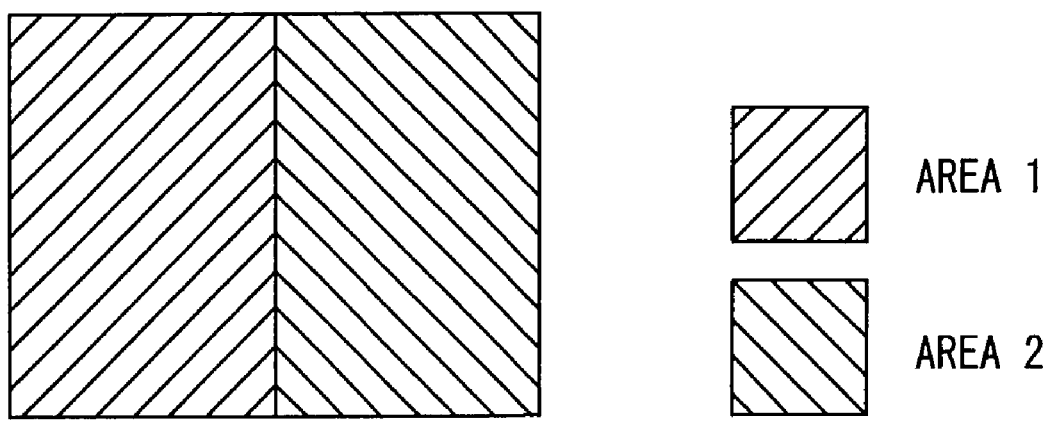
FIG. 6 shows the partial modulations performed on an image that has been split into an area 1 and an area 2.

Furthermore, as shown in FIG. 6, different methods of temporal modulation may be applied by spatial positions. For example, an image may be split into an Area 1 and an Area 2, and different temporal modulations are applied for the two areas. As a result of this difference in the modulation methods, a captured image will show different noises in the Area 1 and the Area 2. By applying different temporal modulation methods at different spatial positions, an even more effective interference signals will be generated in the captured image, and a pattern indicating a piracy may be added for a viewer viewing the captured image.

When different optical intensity modulation methods are applied at different spatial positions, however, a viewer directly viewing the image on which the optical intensity modulation is applied, may see an image that is different from the original image, when scanning across the screen. When the viewer scans across the screen, his or her vision captures optical signals that have been integrated over an area that is different from an area intended for the optical integration with the optical modulation method. An example will be described next.

Figure 7A:
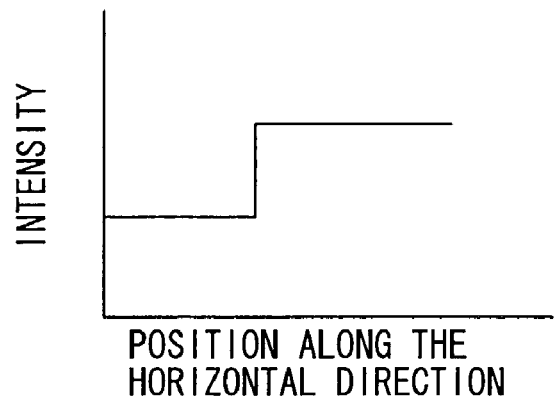
FIG. 7 is a diagram showing an intensity distribution along a horizontal direction in the image.
Figure 7B:
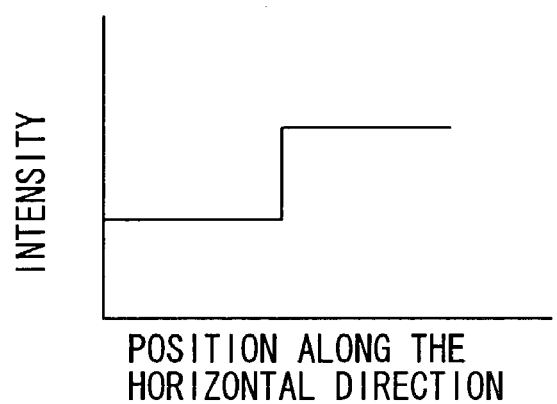
Figure 7C:
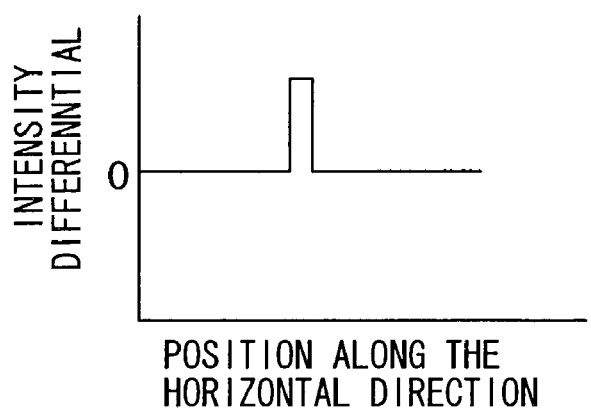

Assume in this example that different temporal modulation methods are applied at different spatial positions on an image having a uniform intensity across the entire display. As shown in FIG. 6, the image is split into the Area 1 and the Area 2, and optical intensity modulations in the temporal domain with sinusoidal waveforms, which are out of phase by 180°, are applied on the two areas. FIG. 7($a$) shows an intensity distribution across the image in a horizontal direction in a given time period. If the viewer does not scan across the image, his or her vision will integrate the temporal modulation signals at correct spatial locations. The viewer will not perceive a difference in the intensities between the Area 1 and the Area 2 in a given time period, which is shown in FIG. 7($a$), but instead see a uniform intensity. However, as shown in FIG. 7($b$), when the viewer scans across the image in the horizontal direction, the viewer would see an intensity distribution that is different from the distribution originally intended. FIG. 7($c$) shows a differential between the intensity distribution actually seen and the intensity distribution that was originally intended. As a result of this difference, the viewer will see stripes in the image, instead of a uniform intensity. Instead of having a uniform intensity, the image will include edges and suffer from a loss of quality. Therefore, while it is possible to enhance the interference effect by applying different types of modulations at different spatial positions, the resulting display image may become susceptible to noises, when the viewer, directly viewing the image, scans across the image.

In order to address the noise issue described above, the present invention proposes a method of the optical intensity modulation that satisfies a Condition 1, which will be described next, so that the modulation would not be perceived by a viewer directly viewing the display image without relying on an image capturing apparatus, while the viewer would perceive the noises (an optical state variation that is independent of the original display image), that interfere with the viewing, in an image captured using, for example, an image capturing apparatus.

Condition 1: In any given time period, the spatial components of the optical intensity modulation must include high spatial frequency components.

A optical intensity modulation that satisfies the Condition 1 will be less susceptible to image degradation when the viewer scans across the image for a reason that will be described next.

Figure 8A:
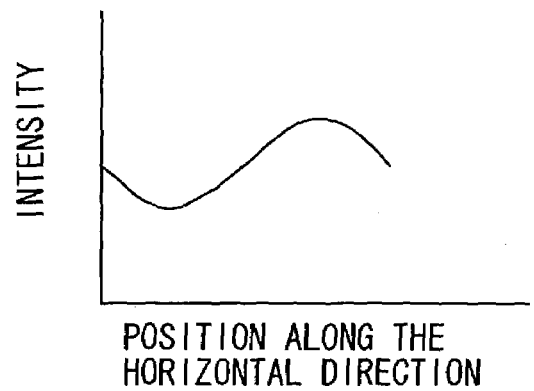
FIG. 8 is a diagram showing an intensity distribution along a horizontal direction in the image, after a modulation has been applied.
Figure 8B:
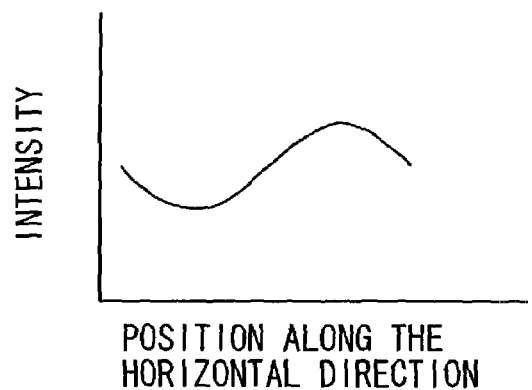
Figure 8C:
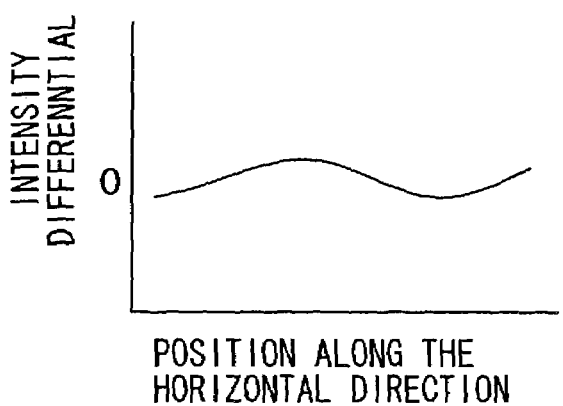

In the example shown in FIG. 6, the phases of the sinusoidal waveforms corresponding to the optical intensity modulations were off by 180° between the two areas. FIG. 8($a$) shows an optical intensity distribution (intensity) horizontally across the image at a given time after the optical modulations have been applied. These optical modulations are in the temporal domain in sinusoidal waveforms, the phases of which are shifted by $2\pi x/d$ for each horizontal position. Furthermore, a spatial distribution of the modulation levels only contains low frequency components. Here, x is a position over a horizontal line across the image, and d is a width of the image. FIG. 8($b$) shows an intensity distribution that would be actually seen by a viewer scanning his or her eyes in the horizontal direction. FIG. 8($c$)

shows a differential between the intended intensity distribution and the intensity distribution that is actually seen, and indicates a degradation in image quality in the image that is supposed to have a uniform optical state. When compared against FIG. 7(c), noises resulting from the optical intensity modulations, the spatial distribution of which has only low frequency components, are smaller in amplitude and show the differential of the lower spatial frequency in all time periods. A human vision does not perceive the modulations that are smaller in amplitude or have fewer high spatial frequency components, according to Visual Information Processing Handbook, Chapter 5, Section 1, Asakura Publishing. As a result, the resulting noises would be less perceptible, and the degradation in image quality would be less likely even when the viewer scans his or her eyes across the image.

The recorded image, on the other hand, would capture the differences in the optical intensity modulations in the temporal domain, that are applied differently at various positions in the display image, and would include different noises at different spatial positions. In this particular example, the recorded image will include a sinusoidal modulation in luminance along the horizontal direction in each frame. Positions of the peaks in the sinusoidal waveform corresponding to the optical intensity modulation will move in a horizontal direction with each frame with a constant spacing in between. As a result, unlike the display image having a uniform optical state presented to the audience viewing the image directly, the captured image will include stripes that move in the horizontal direction. The human visual sensitivity to a spatial and temporal frequency is higher for a contrast modulation that includes some spatial frequency components (up to 5 cycles per degree), compared with a contrast modulation with no spatial frequency components (Visual Information Processing Handbook, Chapter 5, Section 1, Asakura Publishing). Therefore, the stripe pattern in the recorded image would be all the more perceptible. A optical intensity modulation in the temporal domain with a spatial variation that satisfies the Condition 1 will be more effective in interfering with the viewing of a recorded image, compared with an optical intensity modulation in the temporal domain that is performed uniformly across the entire screen irregardless of the spatial positions.

In the example described above, the phases were changed continuously for various spatial positions in realizing the optical intensity modulations in the temporal domain that vary by spatial position in order to meet the Condition 1. Instead, the Condition 1 can also be satisfied by changing the amplitude or waveforms used for the optical intensity modulation in the temporal domain in a continuous manner or by spatial positions. Alternatively, a combination of these methods may be utilized.

(A-5) Other Applications

The optical intensity modulations satisfying the above modulation conditions may be used to interfere with the viewing of the recorded image obtained through image/video piracy. Alternatively, the technologies according to the embodiments described above may also be used for various other applications. For example, the technologies may be utilized for a method and/or apparatus for superposing an electronic watermark.

(B) Specific Embodiments

Next, embodiments utilizing the above described basic principle will be described. The basic system construction remains the same, whether the system is used for interfering with the viewing of the recorded image obtained through image/video piracy or for recording an electronic watermark for tracking the image/video piracy.

There are two types of systems for applying the optical intensity modulations on the display image. One such system is a system utilizing a display apparatus that projects an image on a screen, while the other system utilizes a display apparatus that is viewed directly.

In either of these systems, the optical intensity modulation may be applied in an optical path between the display apparatus and the viewer when the optical intensity modulation is not applied on an output light emitting from an optical source. Alternatively, the optical intensity modulation may be applied on the optical source or driver signals for the optical source, and the optical state of the output light from the optical source is modulated at the point of emission. In yet another approach, the optical intensity modulation may be applied on the image signal. The optical intensity modulation may be applied to perform the modulation in either the contrast domain or the color domain.

(B-1) Examples of Projection Systems (a) First Example of Configuration

In the present example, a system functions as an optical intensity modulation application system for applying modulation on the display image in such a way that an optical state variation independent of the original display image becomes visible in the recorded image obtained by image-capturing the original display image, while no interfering effect is visible in the displayed image shown on the screen when the displayed image is viewed directly. The system includes the following:

(1) a display apparatus projecting the display image onto the screen; and (2) an optical state modulation apparatus acting on the projection light in the projection optical path so as to apply a periodic optical intensity modulation in the temporal domain on the original display image.

The system relates to the method for modulating the optical state of the projection light in the optical path between the optical source and the audience.

(a-1) Specific Example 1

Figure 9:
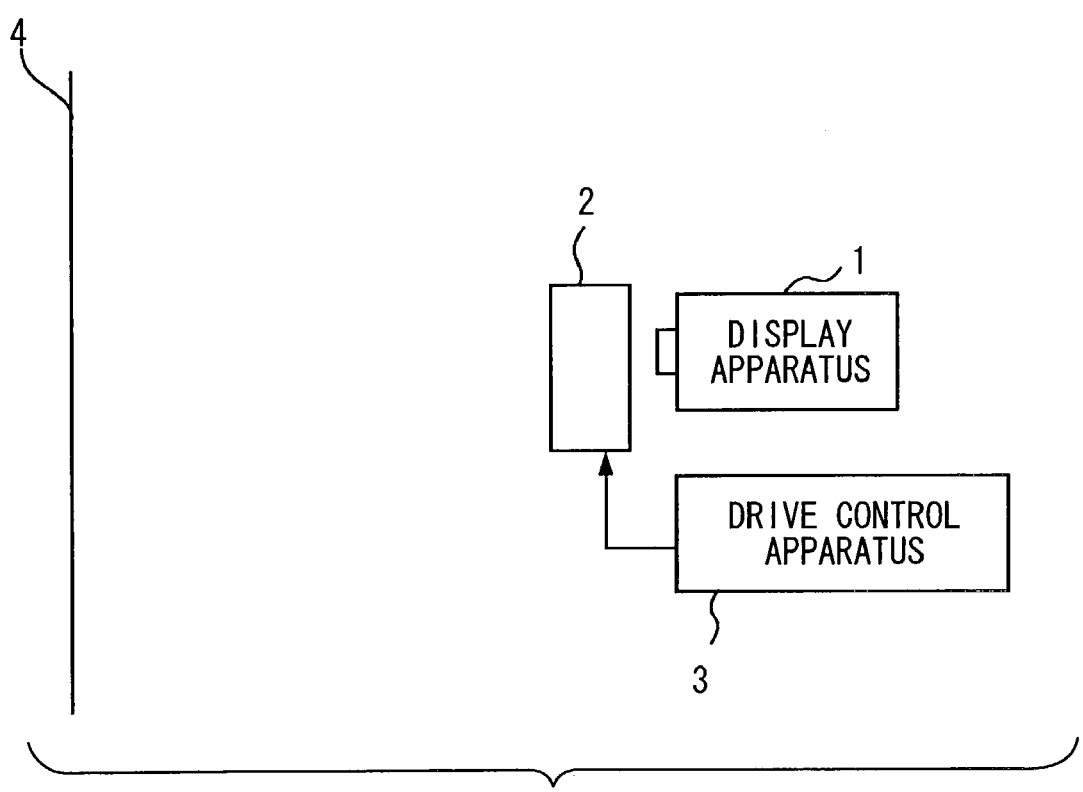
FIG. 9 shows a configuration example of a projection type system (of a projection light modulation type)

FIG. 9 shows the first specific example of the present system. The system of FIG. 9 is based on a technique of applying modulation on a projection light at a position in front of a projection lens of a display apparatus.

As shown in FIG. 9, the system includes the display apparatus 1, an optical state modulation apparatus 2, applying an optical intensity modulation on the projection light, and a drive controller apparatus 3, driving and controlling the optical state modulation apparatus 2. A screen 4 may be a part of the present system or may be omitted from the present system. All or some of the configuration elements of the present system may be distributed in a single casing to compose an integrated apparatus. The system may also be packaged in a single unit or a plurality of units to compose one or more commercial products. Specifically, the display apparatus 1, the optical state modulation apparatus 2, and the drive controller apparatus 3 may be placed in separate casings and distributed separately. However, in most cases, these apparatuses are likely to be stored in a single casing, considering the way in which the present system will be used.

The display apparatus 1 optically magnifies an image on the display screen and projects the image on the screen 4. There are two ways to position the display apparatus 1. One is to position the display apparatus 1 in front of the screen 4 (on the audience's side), and the other is to position the display apparatus 1 behind a translucent screen (at a rear side). In the former arrangement, a light reflecting off of the screen surface is viewed by the audience, and a front projection type of display apparatus is employed. In the latter arrangement, a light transmitted through the translucent screen is viewed, and a rear projection type of display apparatus is employed. In the latter arrangement, the translucent screen and the system are likely to be distributed as an integral unit.

The display apparatus 1 may include a signal processing unit for processing an image signal, an optical system for projecting the display image onto the screen 4, and an optical source. The display apparatus 1 may be realized in various forms by utilizing various combinations of conventional technologies.

For example, the display apparatus 1 may be realized with a movie film projector, a CRT (Cathode Ray Tube) projector, a LCD (Liquid Crystal Display) projector, a LED (Light Emitting Diode Display) projector, a PDP (Plasma Display Panel) projector, a DLP (Digital Light Processing) projector, a FED (Field Emission Display) projector, or an ILA (Image Light Amplifier) projector. The DLP projector is a projector that utilizes a digital micro-mirror device as an image generating device.

The optical state modulation apparatus 2 is provided to perform the optical intensity modulation on the optical state of the projection light (display image) from the display apparatus 1 and should be capable of controlling increase/decrease of the optical state of light projected by the display apparatus 1 onto the screen 4. Such a mechanism may be realized in various ways.

Figure 10:
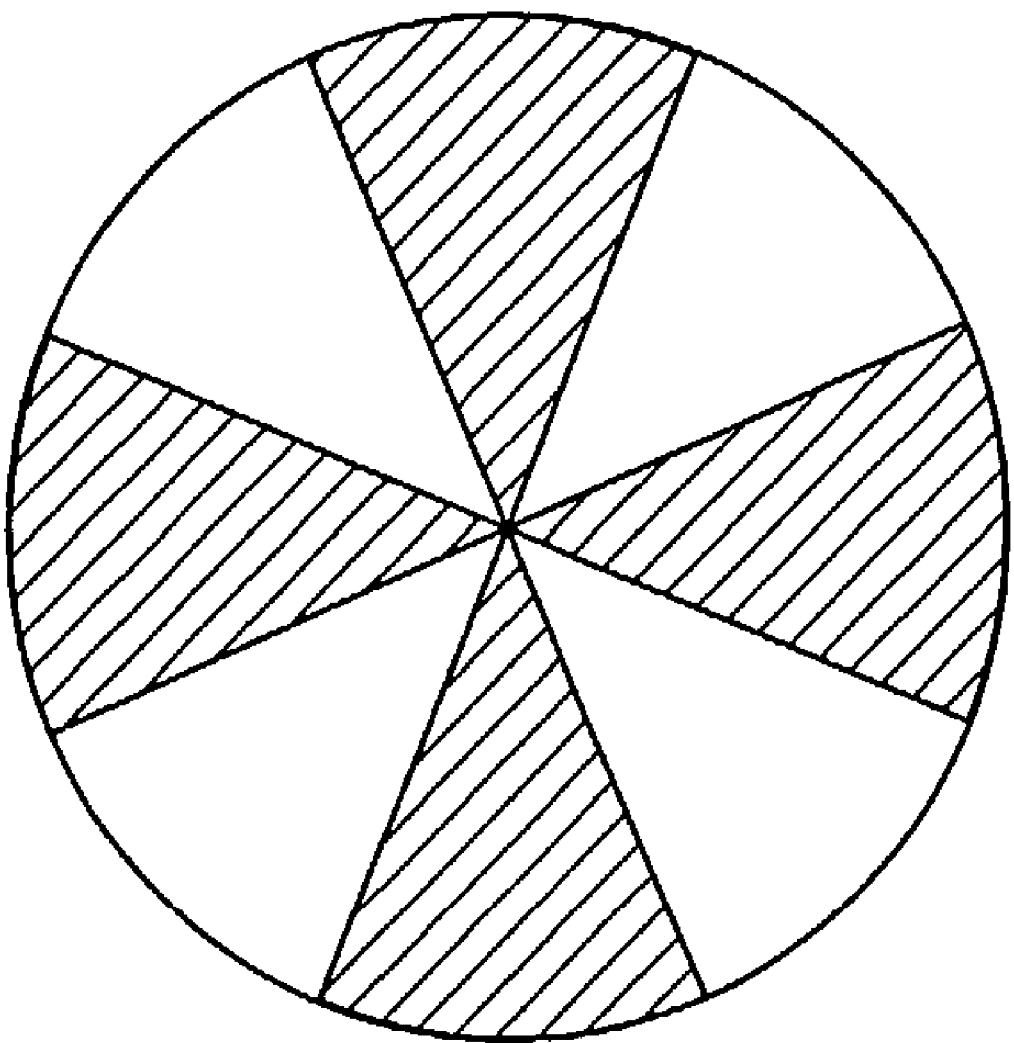
FIG. 10 shows a configuration example of a rotation filter.
Figure 11:
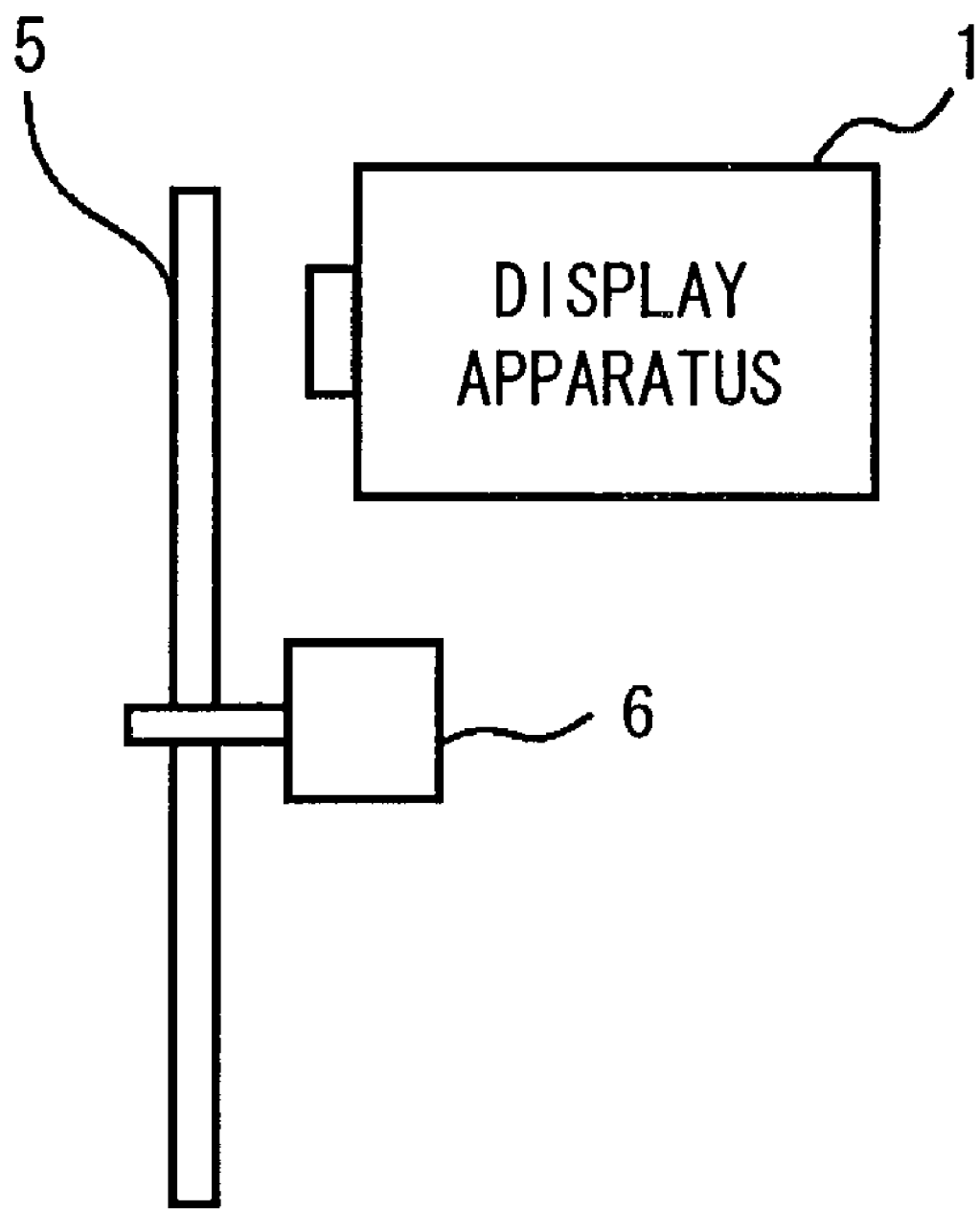
FIG. 11 shows a configuration example of an optical state modulation apparatus.

For example, a rotation filter 5, the density of which varies with a rotation angle along its circumference direction, may be used as an optical state modulation device of the optical state modulation apparatus 2, as shown in FIG. 10. A desired optical intensity modulation can be accomplished, as shown in FIG. 11, by connecting the rotation filter 5 with a rotation motor 6 to rotate the rotation filter 5 at a constant speed and, thereby, increasing or decreasing the luminance of the light transmitted through the rotation filter 5 according to a density pattern provided thereon. The density pattern formed along the circumference of the rotation filter 5 may be in a sinusoidal waveform or may consist of transparent parts and non-transparent parts that alternate with each other. The rotation speed of the rotation motor 6 may be constant or variable, so as to accomplish the optical state variation that satisfies the above described conditions.

Alternatively, the optical state modulation device in the optical state modulation apparatus 2 may be a shutter device, such as a mechanical shutter or a LCD shutter, or a polarization device, such as a polarization filter. Any of these devices can achieve the optical intensity modulation of the optical state and provide a similar effect as the rotation filter 5.

Although the optical state modulation apparatus 2 is placed immediately next to the optical lens in the example shown in FIG. 9, the position of the optical state modulation apparatus 2 is not limited to this position. The optical state modulation apparatus 2 may alternatively be placed in front or back of the optical source or in front or back of an image generator device, such as a LCD panel, as long as the optical state modulation apparatus 2 is located in an optical path between the optical source and the audience. Obviously, the optical intensity modulation can be performed no matter where the optical state modulation apparatus 2 is placed. A layout shown in FIG. 9 offers an advantage in that the optical state modulation apparatus 2 can be easily attached on the display apparatus 1.

The drive controller apparatus 3 is an apparatus for driving and controlling the optical state modulation apparatus 2, so as to satisfy the modulation conditions defined in the section (A-2). Specific processing steps executed by the drive controller apparatus 3 may depend on the optical state modulation apparatus 2 being controlled. For example, in the example shown in FIG. 11, the drive controller apparatus 3 includes a servo function unit that controls the rotational speed of the rotation motor 5. Specifically, the drive controller apparatus 3 detects a rotational speed of the rotation motor 5, compares the detected rotational speed with a predetermined target value for the rotational speed, and controls the rotation motor 5 to achieve the predetermined target value. The predetermined target value for the rotational speed for controlling the drive controller apparatus 3 may be determined in advance by taking into account the density pattern of the rotation filter 5. The predetermined target value may be stored in a memory (storage unit) in the drive controller apparatus 3.

When the optical state modulation apparatus 2 includes the mechanical shutter or the liquid crystal shutter, the opening and closing of the shutter are controlled. If the mechanical shutter includes a rotary disc having notches or small holes for optical transmission, a mechanism similar to the rotation filter described earlier may be used. The mechanical shutter is opened and closed by the drive control apparatus 3, which controls the speed and/or movement of parts that shield off the projection light. The liquid crystal shutter is opened and closed by the drive control apparatus 3, which controls the arrangement of liquid crystal molecules.

For example, with the polarization device (polarization filter) that is provided as the optical state modulation apparatus 2, the drive control apparatus 3 controls the polarization angles of a pair of polarization filters, that are facing each other, so as to apply the optical intensity modulation on the optical state that would be perceptible to the audience. Alternatively, one of the pair of polarization filters may be handed out to the audience. For example, a pair of glasses with the polarization filter may be worn by each viewer.

(a-2) Specific Example 2

FIG. 12 shows a specific example 2 of the present system. The system in FIG. 12 is a variation of the specific example 1 and provides a function for changing the modulation method based on the image contents, in addition to the functions described for the specific example 1. Although the method of modulation is changed with the image contents in the present example, the method of modulation may also be changed over time and independently from the image contents in this variation.

Figure 13:
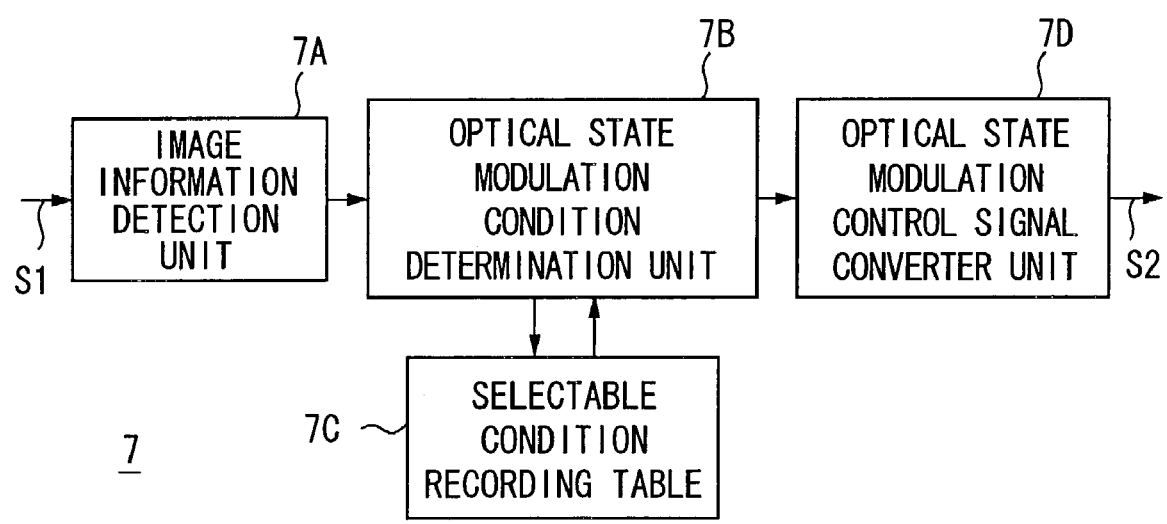
FIG. 13 shows a configuration example of a drive condition determination apparatus.

In FIG. 12, the same reference numerals as those in FIG. 9 are used for the corresponding parts. Detailed explanations regarding the display apparatus 1, the optical state modulation apparatus 2, and the drive controller apparatus 3, which have the same functions and constructions as in the specific example 1, will not be provided. One of the features unique to the system in FIG. 12 is a drive condition determination apparatus 7. The drive condition determination apparatus 7 detects a luminance signal or color signal in an image signal S1 and changes a drive condition accordingly. FIG. 13 shows an example of an internal construction of the drive condition determination apparatus 7.

The drive condition determination apparatus 7 shown in FIG. 13 includes an image information detector 7A, an optical state modulation condition determination unit 7B, a selectable condition record table unit 7C, and an optical state modulation control signal converter 7D.

The image information detector 7A is provided to detect a desired image information in the image signal SI. The image information may include an average luminance value (or color value) for the entire display screen, an average luminance value (or color value) in a particular portion of the display screen, an integrated value calculated by assigning prescribed weight with respect to a luminance distribution in the display image, and a color distribution. In the example shown in FIG. 12, the image information detector 7A accepts as input the image signal S1 that is provided to the display apparatus 1. However, the present embodiment is not limited only to such a configuration. Alternatively, the image information detector 7A may accept as input the image signal for display image on the display apparatus 1, captured by an image-capturing apparatus such as a video camera.

The optical state modulation condition determination unit 7B (referred to as determination unit 7B hereafter) determines the modulation condition based on the detected image information. Here, the optical state (luminance or color) detected by the determination unit 7B may be related to the entire display screen or to a partial area thereof on which the optical intensity modulation is to be applied.

The determination unit 7B accesses the selectable condition record table unit 7C and, based on the detected optical state (luminance or color), selects an appropriate modulation condition (e.g. amplitude, frequency, waveform) among the selectable conditions that would create the visual effects described above in the recorded image obtained through image/video piracy. The selection criteria may include, for example, whether or not the amplitude of the optical state variation in the recorded image exceeds a predetermined value, and/or, whether or not the frequency of the temporal variation in the optical state in the recorded image makes the variation perceptible to the human vision (e.g. 1–20 Hz). Alternatively, other selection criteria may also be used.

The selectable condition record table unit 7C provides the combinations of modulation conditions so that the determination unit 7B can select an appropriate modulation conditions. Here, it is assumed that such combinations of modulation conditions, for generating the visual effect on the recorded image as described above in the recorded image obtained through image/video piracy, are calculated or obtained in advance. The selectable condition record table unit 7C records a plurality of combinations of a plurality of modulation conditions.

The optical state modulation control signal converter 7D converts the selected modulation condition to specific drive information. The drive information converted into a format appropriate for the optical state modulation apparatus 2 and/or a control method of the drive controller apparatus 3. For example, the modulation condition is converted into a target value for the rotational speed when the rotational filter 5 is used as in the specific example 1. The converted drive information is supplied to the drive controller apparatus 3 as an optical state control signal S2. Obviously, the optical state modulation control converter 7D includes a conversion table and/or a conversion equation for converting the modulation condition to predetermined drive information and performs the conversion by referencing the conversion table and/or the equation.

(b) Second Example of Configuration

In the present example, a system functions as an optical intensity modulation application system for applying modulation on the original display image in such a way that an optical state variation, that is independent of the original display image, becomes visible in a recorded image obtained by image-capturing of the original display image, while no interfering effect would be visible in the displayed image shown on the screen when the displayed image is viewed directly. The system includes the following:

(1) a display apparatus projecting the display image onto a screen; and (2) an optical state modulation apparatus controlling the optical source of the projector apparatus and applies a periodic optical intensity modulation in the temporal domain on original display image.

The system relates to a method of generating a projection light in which the optical intensity is modulated by controlling the optical source itself.

(b-1) Specific Example 1

Figure 14:
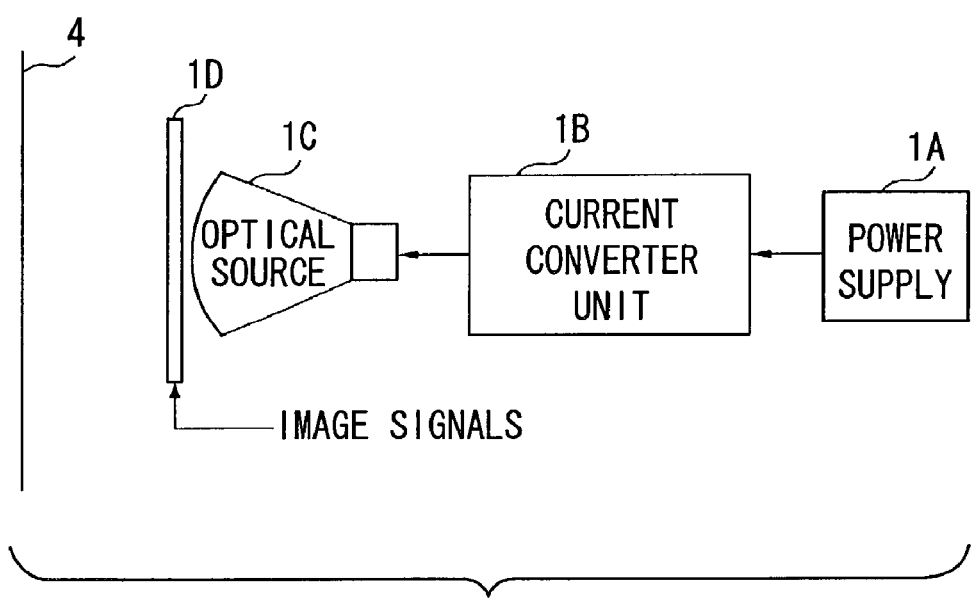
FIG. 14 shows a configuration example of a projection system (of an optical source modulation type)

FIG. 14 shows a specific example 1 of the present system. The system in FIG. 14 relates to a technique of applying an optical intensity modulation on the projection light by modulating the emitted light from a display apparatus that is of a non self-emitting type. The display apparatus of a non self-emitting type may be a film movie projector, a liquid crystal display projector, a DLP type projector and an ILA type projector.

In the example in FIG. 14, a current modulation apparatus 1B is the optical state modulation apparatus of the present embodiment. The current modulation apparatus 1B increases and/or decreases the luminance of a light from the modulated optical source 1C by modulating a drive current provided from a power supply 1A to the optical source 1C with signals having a waveform of a predetermined amplitude and frequency. Here, the signal's waveform is assumed to satisfy the modulation conditions defined in the previous section (A-2) and refers to a signal having a predetermined waveform.

The light from the optical source, on which the optical intensity modulation is applied, may be directly projected by an image generation unit ID onto the screen 4. As a result, the modulation is applied on the image displayed on the screen so as to generate the above cited visual effect in the recorded image that is obtained by image/video piracy of the displayed image. The image generation unit ID generates the display image by reflecting or letting pass through the light from the optical source. The image generation unit ID may utilize a movie film, a liquid crystal filter, a DMD device or the like.

In the example of FIG. 14, it is assumed that information relating to the waveform of the signals used for the optical intensity modulation in the current modulation apparatus 1B is stored in advance, for example, in a memory. Alternatively, the modulation condition (e.g. amplitude, frequency, waveform) to be used in the optical intensity modulation may be determined based on the information relating to the display image in a similar way as the specific example 2 in FIG. 12.

Although FIG. 14 illustrates the system in which the drive current supplied to the optical source 1C is controlled, the present embodiment is not limited thereto. Alternatively, a similar control technique may be used in a system in which a drive voltage is controlled. In such a system, a voltage modulation apparatus may be used for performing a similar control on the drive voltage that is supplied from the power supply 1A. Furthermore, while the current modulation apparatus 1B is placed inside the display apparatus 1 in FIG. 14, the present embodiment is not limited thereto. Alternatively, the current modulation apparatus 1B may also be placed outside the display apparatus 1.

The above described system may be used in a rear-projection system, as well as a front projection system.

(b-2) Specific Example 2

Figure 15:
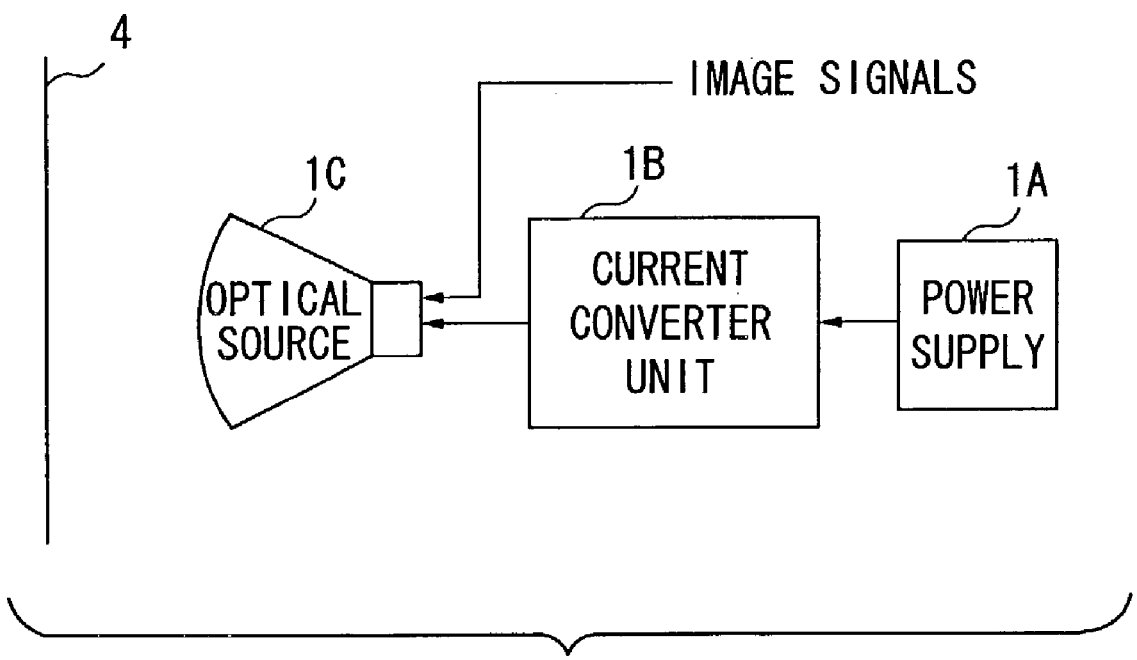
FIG. 15 shows a configuration example of a projection system (of an optical source modulation type)

FIG. 15 shows a specific example 2 of the present system. The system in FIG. 15 is related to a technique of applying the optical intensity modulation on the projection light by modulating the emission of light from the optical source itself in a self-emitting projection system. The same reference numerals are used for the corresponding elements shown in FIG. 14 and FIG. 15. The projection apparatus of a self-emitting type may be a CRT projector, a LED projector, a plasma display projector, or a FED type projector.

The present system is different from the system in the specific example 1 in that the image signal is used in the optical source 1C. Accordingly, the display image is generated with the output light from the optical source 1C.

The same current modulation apparatus 1B as that of the specific example 1 may be used in the present system. Even in the present system, the optical intensity modulation, that is independent of the image signal, may be applied on the display image by controlling the drive current supplied to the optical source 1C using the current modulation apparatus 1B.

Obviously, the similar control technique, in which the drive voltage is controlled, may also be used in this system. Furthermore, while the current modulation apparatus 1B is placed inside the display apparatus 1 in FIG. 15, the current modulation apparatus 1B may also be placed outside the display apparatus 1.

The above described system may be used for a rear-projection system, as well as a front projection system.

(b-3) Specific Example 3

A specific example 3 is a variation of the specific examples shown in FIG. 14 and FIG. 15. The same system configurations as in the previous specific examples may also be employed in the present example.

The present specific example is related to a system including a projector apparatus that utilizes a PWM (Pulse Width Modulation) method to control the light emission from the optical source. Such a display apparatus may be, for example, a DLP type projector, a PDP type projector or the like. The projector apparatus of this type generates a gray scale (tone) by a plurality of emission and non-emission cycles in each frame. Accordingly, the above described visual effect may be realized by applying the modulation on such an emission sequence.

Figure 16A:
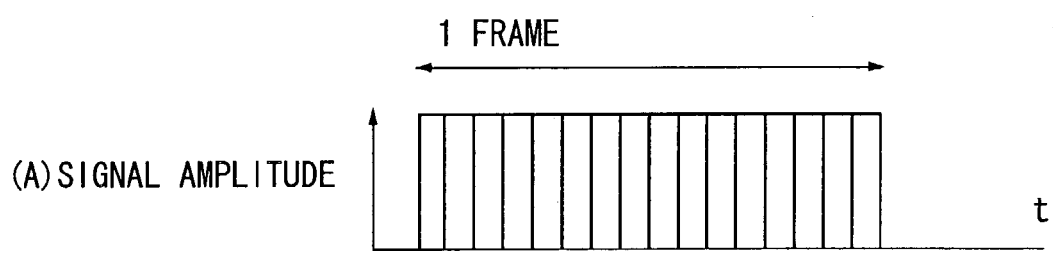
FIG. 16 shows an application example of the pulse width modulation method on the display apparatus.
Figure 16B:
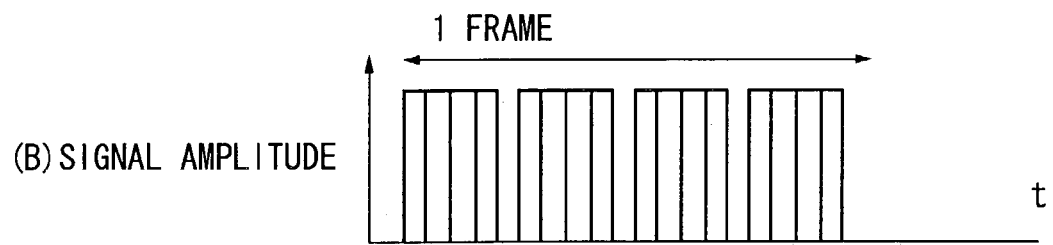

The gray scale representation by the PWM method is performed in the following way. For example, the gray scale may be represented by a drive pattern (a sequence pattern of pulses) shown in FIG. 16(A) in case of a sixteen-level gray scale. As shown in FIG. 16(B), non-emitting cycles may be added in a periodic manner to the original drive pattern (FIG. 16(A)) in the present specific example. Obviously, the period and duration of the non-emitting cycles must be determined based on the modulation condition defined in the section (A-2).

(c) Third Example of Configuration

In the present example, a system functions as an optical intensity modulation application system for applying modulation on the original display image in such a way that an optical state variation, that is independent of the original display image, becomes visible in the recorded image, obtained by image-capturing of the original display image, while no interfering effect would visible in the displayed image shown on a screen when the displayed image is viewed directly. The system includes the following:

(1) a display apparatus projecting the display image onto screen; and (2) an optical state modulation apparatus controlling the image signal of the projector apparatus and applying a periodic optical intensity modulation in the temporal domain on the original display image.

The system relates to a method of modulating the image signal in advance of generating the display image.

(c-1) Specific Example 1

Figure 17:
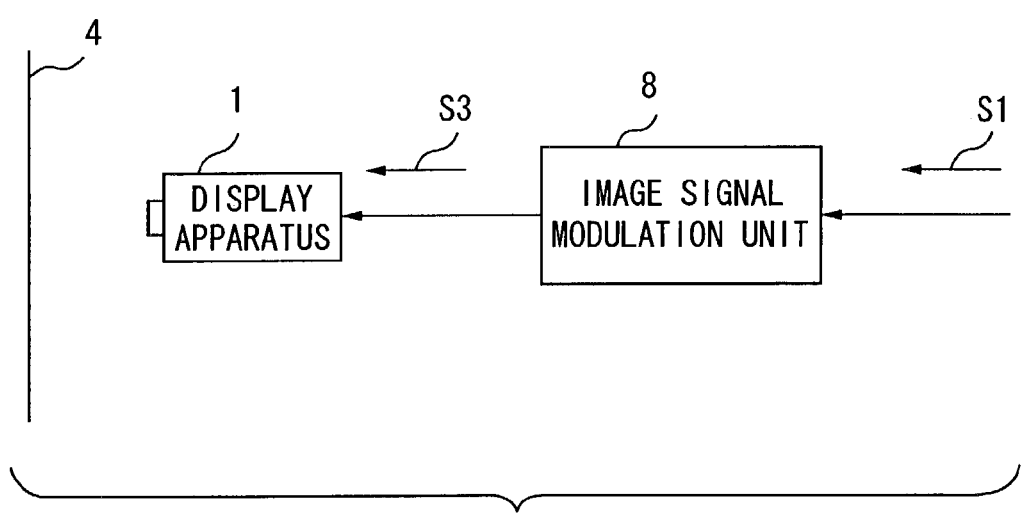
FIG. 17 shows a configuration example of a projection system (of an image signal modulation type)

FIG. 17 shows the first specific example 1 of the present system. The system of FIG. 17 is related to a technique of applying modulation on the image signal to be entered into the display apparatus 1. In the system in FIG. 17, such a modulation function is provided by an image signal modulation apparatus 8. While the image signal modulation apparatus 8 is placed outside of the display apparatus 1 in the present specific example, the image signal modulation apparatus 8 may also be placed inside the display apparatus 1. The display apparatus 1 may be of the non self-emitting type or the self-emitting type.

There are various ways of applying the optical intensity modulation on the image signal. In the present specific example, a single frame is copied to create a plurality of frames, having different optical states from each other, and the plurality of frames are provided as output within the display period of the single frame. The 'frame' is a unit of display operation in the display apparatus and may also be called a 'field' or a 'shot' or the like, depending on the display apparatus in use.

For example, if an image signal for two frames were to be generated from the image signal for a single frame, the generated image signal output would have a frame rate that is double the input frame rate. Furthermore, when the image signal for a single frame is converted into two frames, the luminance of the two frames would be different from each other.

The optical intensity modulation being applied in the present specific example should satisfy the modulation condition described in the section (A-2). As a result, viewing of the recorded images obtained by image capturing of the displayed images would be hampered, while no interfering effect would be present in the displayed image being viewed directly.

FIG. 18 shows a configuration example of the image signal modulation apparatus 8 that executes the above described modulation scheme. The image signal modulation apparatus 8 in FIG. 18 includes a memory 8A, an image modulation processing unit 8B, a modulation condition record table unit 8C and an image output unit 8D.

The memory 8A provides a temporary storage for the image signal being received. The image modulation processing unit 8B repeatedly accesses the frame image data (e.g. twice) from the memory 8A and applies a predetermined optical intensity modulation on the frame image data being accessed. The luminance-modulated frame image data is immediately transferred to the image output unit 8D. Therefore, the frame image data is transferred a plurality of times during a display period for a single frame.

The image modulation processing unit 8B performs the above described processing steps after accessing data on the conditions for the optical intensity modulation in the modulation condition record table unit 8C. The number of times the data in the memory 8A is accessed is also determined by the conditions for the optical intensity modulation. Here, it is assumed that all of the required modulation conditions are stored in the modulation condition record table unit 8C in advance.

The modulation condition record table unit 8C may be replaced by the selectable condition record table unit shown in FIG. 13, if the image modulation processing unit 8B in the system also performs the processing steps for determining the modulation conditions based on the image signal.

The image output unit 8D is a unit for accepting the image signal input from the image modulation processing unit 8B and transfers the image signal to the display apparatus 1. The image signal fed from the image modulation processing unit 8B to the image output unit 8D is image signal resulting from the modulation process performed by the image modulation processing unit 8B.

Accordingly, the same frame image data is fed to the display apparatus 1 a plurality of times at varying display luminance levels during a display period of a single frame.

In the above described example, the output frame rate of the image modulation processing unit 8B is double the input frame rate. However, in the present embodiment, the output frame rate is not limited to a multiple of the input frame rate. The input frame rate can be multiplied, instead, by any real number, such as, for example, 1.5. When the input frame rate is multiplied by 1.5, time periods of the resulting frames will be generated with varying cycle times. Alternatively, it is also possible, for example, to generate two output frames for a displaying period of one frame and then generate three output frames for a displaying period of another frame.

(d) Fourth Example of Configuration

In the present example, a system functions as an optical state modulation application system for applying modulation on the display image in such a way that an optical state variation that is independent of the original display image becomes visible in the recorded image obtained by image capturing the original display image, while the display image shown on a screen directly viewed by a viewer remains undisturbed. The system includes the following:

(1) A display apparatus of a projection type that projects the display image onto a screen;

(2) An optical state modulation apparatus that applies an optical intensity modulation, having a periodicity in the temporal domain, on an original display image by controlling an image signal in the display apparatus.

This system applies the optical state modulation in an optical path between an optical source and the viewer.

(d-1) Specific Example 1

Figure 19:
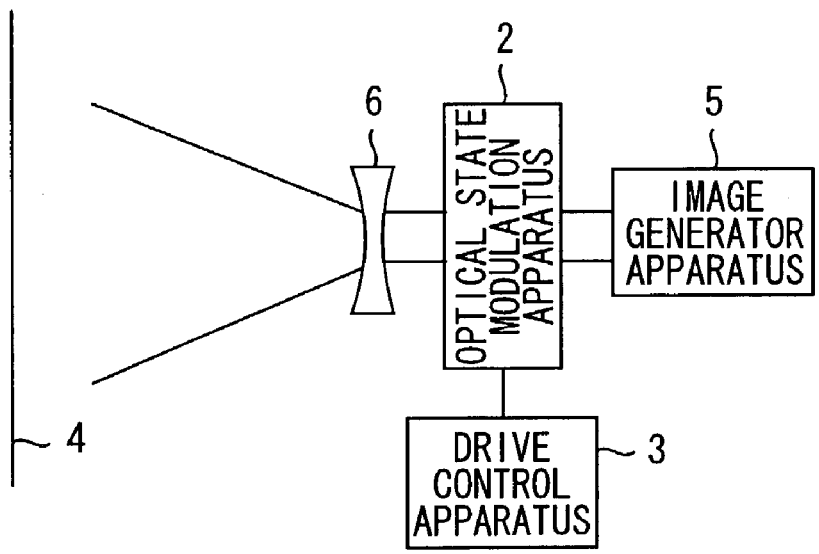
FIG. 19 shows a configuration example of a projection system (of a projection light modulation type)

FIG. 19 show a first specific example of the present system. The system in FIG. 19 applies a modulation on a projected light in an optical path of a display apparatus 1.

As shown in FIG. 19, the present system includes the display apparatus 1, which provides a means of projection; an optical state modulation apparatus 2 that applies an optical intensity modulation on an output light; and a drive control apparatus 3 that drives and controls the optical state modulation apparatus 2. An image generator apparatus 5 processes the image signal and generates and projects an image through an image generator device. For example, the image generator device may be a film, a CRT, a liquid crystal, an LED, a PDP (plasma display panel), a DMD (digital micro-mirror device), an FED (field emission display), or an ILA (image light amplifier). A projected light is projected on a screen 4 by a lens 6. The actual configuration and operation of the various members of the present embodiment are as described earlier.

The optical state modulation apparatus 2 provides a means of applying the optical intensity modulations at various spatial positions on the output light from the image generator apparatus 5 in order to realize the optical intensity modulation that satisfies the condition 1 mentioned earlier. Therefore, the optical state modulation apparatus 2 must be able to control by increasing and decreasing the optical state of the output light from the image generator apparatus 5 at different spatial positions. The optical state modulation apparatus 2 may be placed at any position, as long as the optical state modulation apparatus 2 is able to apply the modulations at various spatial positions on the optical path between the point of light emission or a surface of light emission and the observer. The optical state modulation apparatus 2 may be embodied using various methods.

Figure 20:
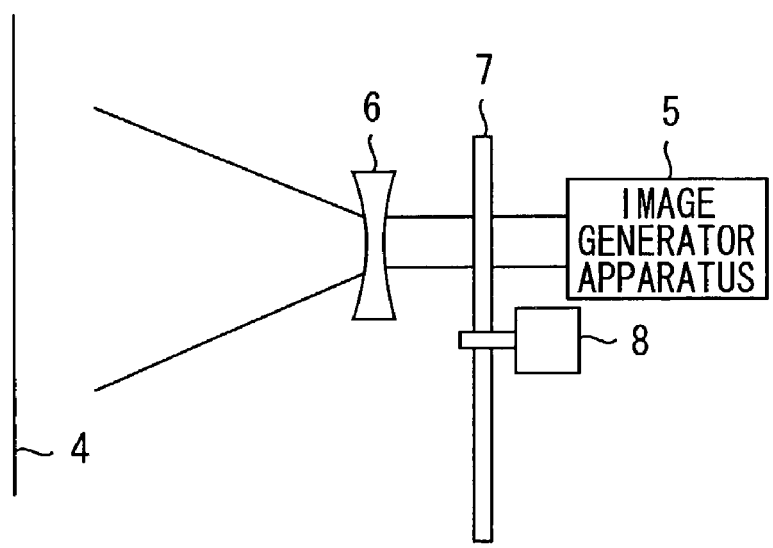
FIG. 20 shows a first configuration example using a rotation density filter in a projection system (of a projection light modulation type)

For example, as shown in FIG. 20, in one method, a rotation density filter 7 may be attached onto a rotation motor 8 and rotated at a prescribed speed.

When a radius is r, and a width of the optical path is d, a transmittance T (r,θ) of the rotation filter at an angle θ would be $$T(r, \theta) = 0.5 + 0.5 \times \sin(\theta + 2\pi r/d)$$

When the rotation filter is rotated at 70 Hz, the temporal modulation mentioned above would be realized at various spatial positions, and a single period of the spatial frequency component of the optical intensity modulation corresponds to a width of the display, and the resulting modulation method satisfies the Condition 1.

While the phase of modulation is changed continuously at each spatial position in the example above, the modulation method that satisfies the Condition 1 can also be realized by changing the amplitude continuously for each spatial position.

For example, when width of the optical path is d, and radius is r, transmittance T (r, θ) of the rotation filter at an angle θ should be $$T(r, \theta) = (0.5 + 0.5 \sin(2\pi r/d)) \times \sin \theta$$

Similarly, the optical intensity modulation that satisfies the Condition 1 can also be realized by adjusting the waveforms used for the temporal modulation at various spatial positions from, for example, a sinusoidal wave to a square wave.

The modulation method that satisfies the Condition 1 can also be realized by combining different phases, amplitudes, and waveforms at various spatial positions.

The optical state modulation device in the optical state modulation apparatus 2 may also be a mechanical shutter, a liquid crystal shutter, and other shutter devices, as well as a polarization filter and other polarization devices. When any of these devices is used, the optical state can be adjusted at various spatial positions to obtain an effect similar to that of the rotation density filter 7.

(d-2) Specific Example 2

Figure 21:
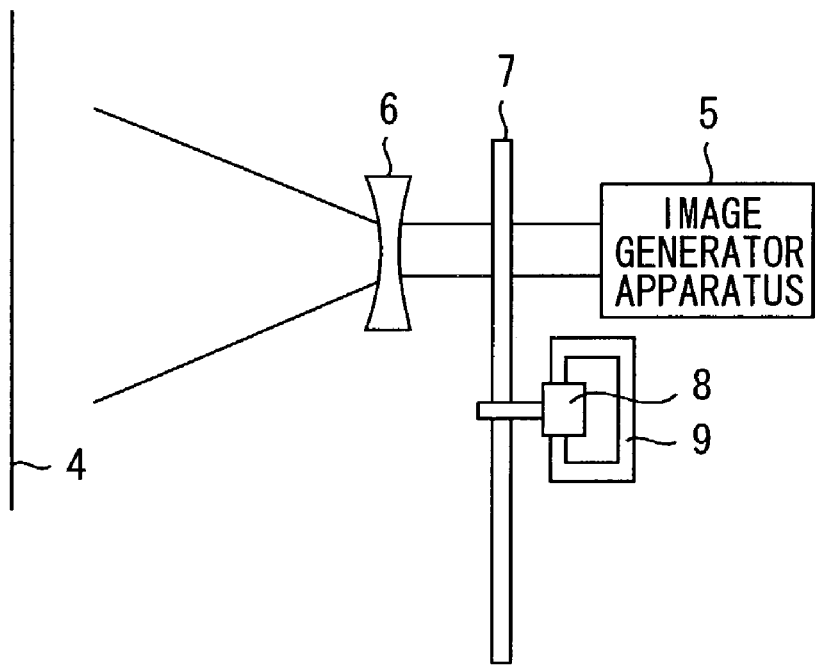
FIG. 21 shows a second configuration example using a rotation density filter in a projection system (of a projection light modulation type)

FIG. 21 shows a variation of an apparatus shown in FIG. 20. A positioning servo apparatus 9 changes the position of the rotation density filter 7. As a result, the interfering effect can be created at any position in order to generate a more effective interfering effect. The position at which the interfering effect is generated can be changed randomly, or information related to the positions for generating the noises may be encoded into the contents in advance. Furthermore, an apparatus may be utilized that can detect the position that will enable an effective interference based on the contents to control the positions at which the noises would be generated.

(e) Fifth Example of Configuration

In the present example, a system functions as an optical state modulation application system for applying modulation on the display image in such a way that an optical state variation that is independent of the original display image becomes visible in the recorded image obtained by image capturing the original display image, while the display image shown on a screen directly viewed by a viewer remains undisturbed. The system includes the following:

(1) A display apparatus of a projection type that projects the display image onto a screen;

(2) An optical state modulation apparatus that applies optical intensity modulations having a periodicity in the temporal domain on the original display image at various spatial positions in the image by controlling an image signal in the display apparatus.

The present system applies modulations on the image signal itself before the image signal is used for generating the display image. The fifth example of configuration incorporates a feature for applying the optical intensity modulation, that satisfies the Condition 1, into the above described method of modulation that is applied on the image signal itself in advance.

(e-1) Specific Example 1

The optical intensity modulation on the image signal may be applied by various methods. For example, a plurality of subframes having various optical states may be generated from a single frame, and these subframes may be fed out during a time period corresponding to a display period for a single frame. In some display apparatus, the frame may be called a field or a shot.

Figure 22:
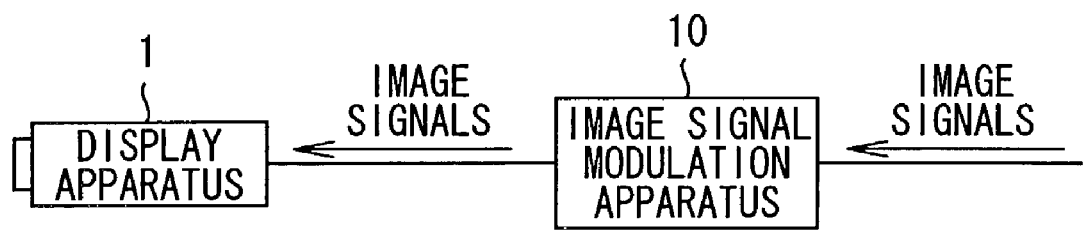
FIG. 22 shows a configuration example of an image signal modulation apparatus in a projection system (of a projection light modulation type)
Figure 23:
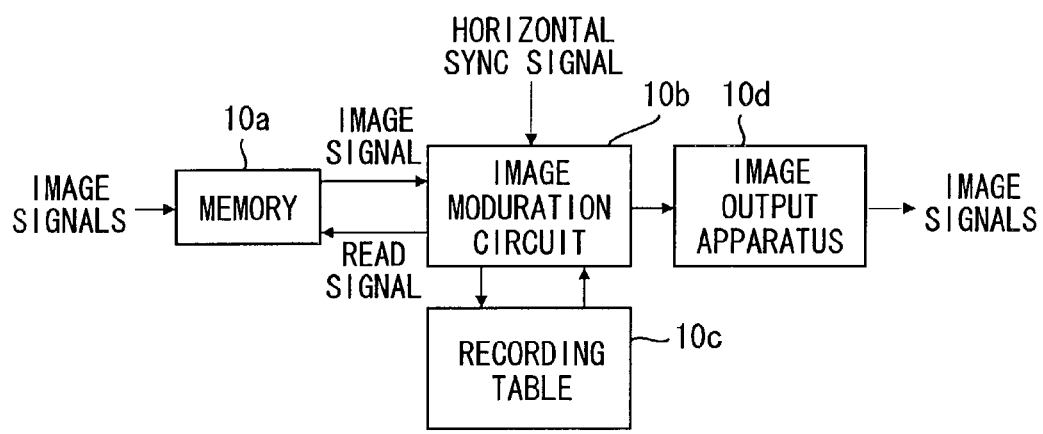
FIG. 23 shows a configuration example of an image signal modulation apparatus.

FIG. 22 and FIG. 23 show an example of a configuration of an image signal modulation apparatus 10 for executing the method of the present example. The image signal modulation apparatus 10 includes a memory 10a, an image modulation processor unit 10b, a modulation condition recording table 10c, and an image output unit 10d.

The memory 10a provides a means of temporarily storing the image signal received. The image modulation processor unit 10b reads out the frame image from the memory 10a a plurality of times, after a frame synchronization signal is received and before the next frame synchronization signal is received, and performs a process of applying the prescribed optical intensity modulation at each spatial position in the frame image. The frame image that has gone through the optical intensity modulation process is immediately transferred to the image output unit 10d. In other words, such frame images are outputted a plurality of times within the display period corresponding to each frame.

The image modulation processing unit 10b reads out data in the modulation condition recording table 10c on the conditions for the optical intensity modulation that would satisfy the Condition 1 and performs the process described above. The number of times the memory 10a is accessed is determined in accordance with the conditions used for the optical intensity modulation. It is assumed that the information related to the modulation conditions is stored in advance in the modulation condition recording table 10c.

The image output unit 10d provides a means of transferring the image signal from the image modulation processing unit 10b to the display apparatus 1.

As a result, the image for a single frame is inputted to the display apparatus 1 a plurality of times with different optical states within a period corresponding to each frame.

(e-2) Specific Example 2

The present example is a variation of the first specific example shown in (e-1). The system configuration is similar to the configuration shown in FIG. 22 and FIG. 23.

The specific example 2 relates to a system that uses a display apparatus based on a PWM (pulse width modulation) method for controlling the image display devices. Such a display apparatus may be, for example, a DLP projector or a PDP projector, etc. Such a display apparatus achieves a gray scale by repeated cycles of light emission and non-light emission within each frame. A temporal optical intensity modulation may be realized by summing periods of non-light emission periodically. The timings for the periods of non-light emission are varied among various spatial positions to realize an optical intensity modulation that satisfies the Condition 1.

(B-2) Direct View System

A control method similar to the method used for a projection system may be used for a direct view system. Therefore, the description below will focus on differences with respect to the projection system.

(a) First Configuration Example

An optical state modulation application system, that applies an optical intensity modulation on a display image in order to add an optical state variation, that is independent of an original display image, to a recorded image captured by an image capturing apparatus, while keeping the display image viewed directly on the display undisturbed, includes the following:

(1) A display apparatus of a direct view type that displays an image on a display screen.

(2) An optical state modulation apparatus that applies an optical intensity modulation having a periodicity in the temporal domain on the original display image by affecting a display light.

This system applies an optical intensity modulation on an optical path between an optical source and a viewer. In most instances, with this type of display apparatus, an optical intensity modulation is likely to be applied on the optical path between the display screen (the screen on which the display image is shown) and the viewer.

(a-1) Specific Example 1

Figure 24:
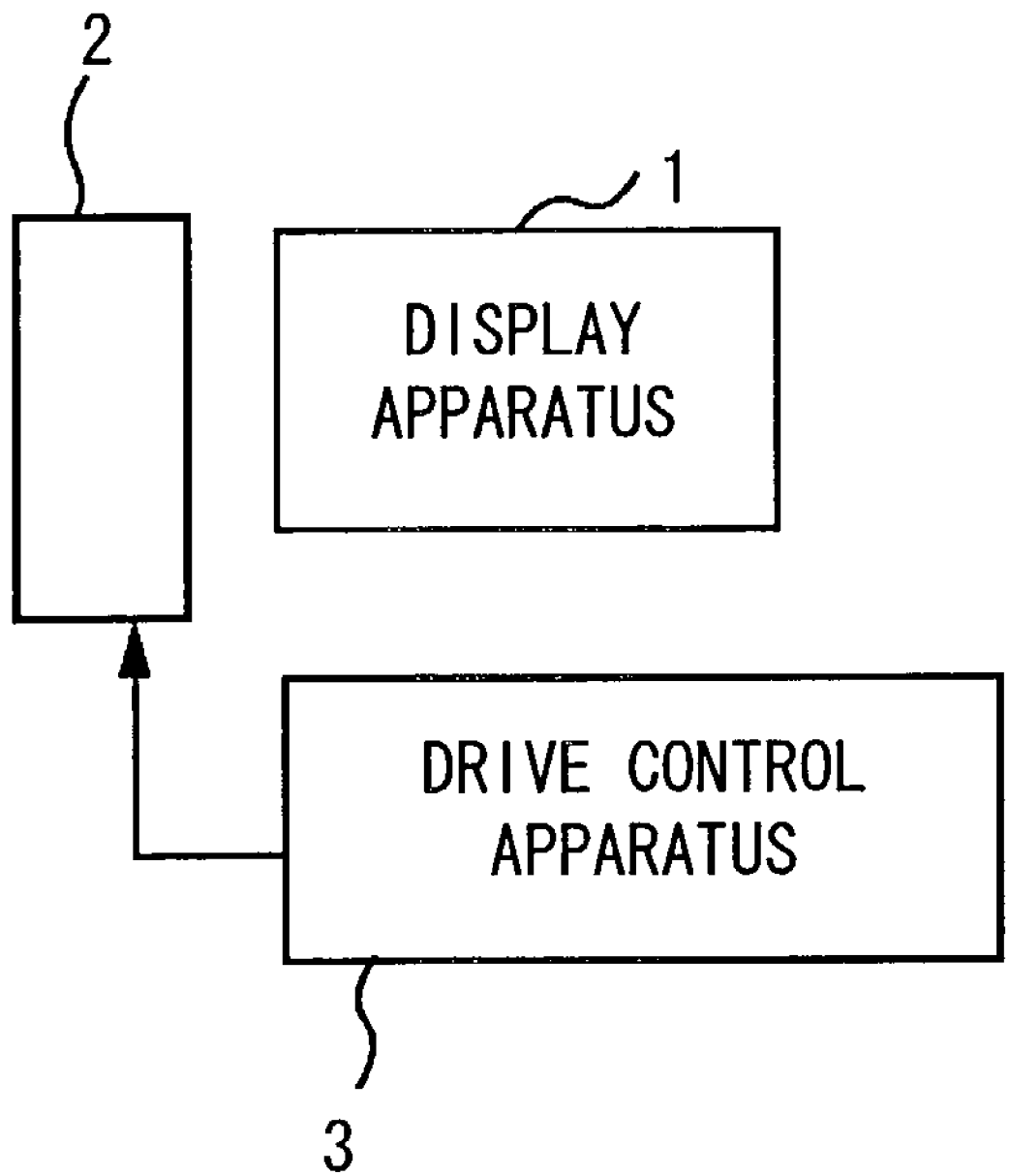
FIG. 24 shows a configuration example of a direct view system (of a display light modulation type)

FIG. 24 shows a first specific example of such a system. The configuration in FIG. 24 corresponds to the configuration in FIG. 9, except that the screen 4 is removed. The display apparatus 1 in this system does not require a projection optical system.

The display apparatus 1 may be a CRT (cathode ray tube) display, a flat panel display (such as an LCD panel, a PDP panel, or an FED (field emission display)), an EL (electroluminance) display, et cetera). The display apparatus 1 may also be a head mount display.

The optical state modulation apparatus 2 may be a mechanical filter shown in FIG. 11, a mechanical shutter, an LCD shutter, a polarization device (polarization filter), and other optical filters. As shown in FIG. 24, a liquid crystal shutter or an optical filter is likely to be used when the optical state modulation apparatus 2 is placed externally to the display apparatus 1. While the optical state modulation device 2 and the display apparatus 1 are shown as separate units in FIG. 24, the optical state modulation apparatus 2 and the display apparatus 1 may, instead, be integrated into a single unit.

If the display apparatus 1 consists of an image generator unit and an optical source, then the optical state modulation apparatus 2 may be placed between the optical source and the image generator device. Such a configuration is also capable of making the viewer perceive the displayed image with an optical intensity modulation.

The same drive control apparatus 3 in FIG. 9 may also be used as the drive control apparatus 3 in the present system. A control method utilized for the drive control apparatus 3, of course, is determined by the optical state modulation apparatus 2 as described above.

(a-2) Specific Example 2

FIG. 25 shows a second specific example of the present system. The configuration in FIG. 25 corresponds to the configuration in FIG. 12, except that the screen 4 is removed. The display apparatus 1 in the present example does not require a projection optical system. Otherwise, the same display apparatus 1, the optical state modulation apparatus 2, and the drive control apparatus 3 as in the specific example 1 may be used. The same drive condition determination apparatus 7 as the drive condition determination apparatus 7 in FIG. 13 may also be used.

(b) Second Configuration Example

An optical state modulation application system that makes an optical state variation, that is independent of an original display image, appear in a recorded image captured by an image capturing apparatus, while keeping a display image, directly viewed on a display screen, undisturbed, includes the following:

(1) A display apparatus of a direct view type that displays an image on a display screen.

(2) An optical state modulation apparatus that applies an optical intensity modulation having a periodicity in a temporal domain on the original display image by controlling an optical source in the display apparatus.

The present system provides a display light output, the optical state of which has been modulated by controlling the optical source itself.

(b-1) Specific Example 1

Figure 26:
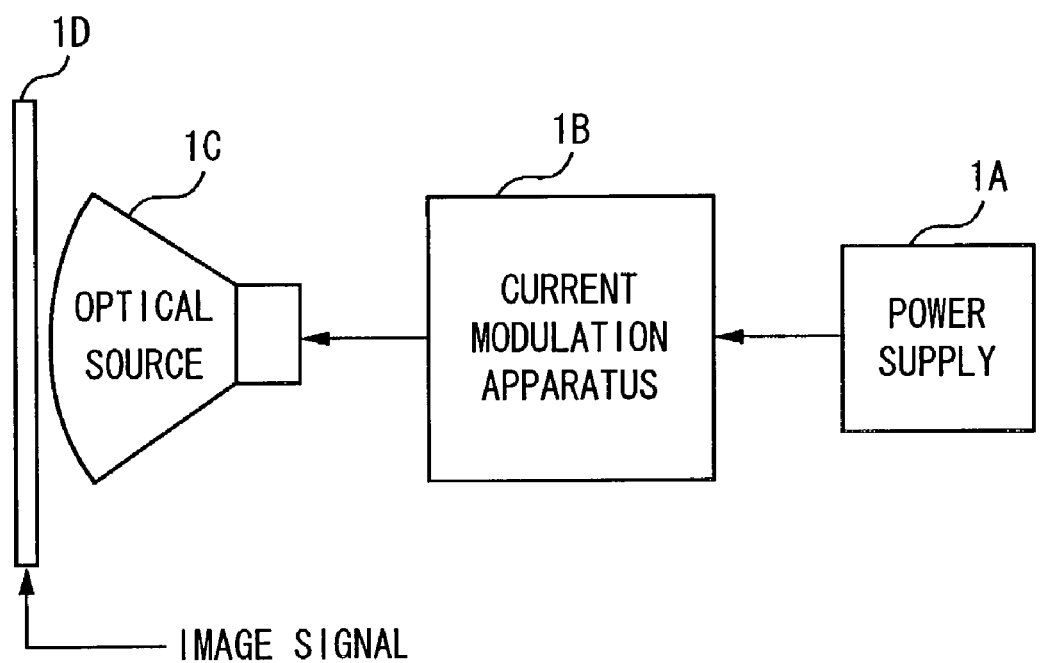
FIG. 26 shows a configuration example of a direct view system (of an optical source modulation type)

FIG. 26 shows a first specific example of the present system. The configuration in FIG. 26 is the same as the configuration in FIG. 14, except that the screen 4 has been removed. The display apparatus 1 in the present example does not require an optical projection system.

The present system relates to a method of modulating a light emitting from an optical source in a display apparatus of a non-light emitting type. The display apparatus 1 may be an LCD panel display or a DLP display.

A current modulation apparatus 1B in FIG. 26 is the optical state modulation apparatus of the present specification. While a drive current for the optical source is modulated in FIG. 26, a drive voltage for the optical source may be modulated, instead.

(b-2) Specific Example 2

Figure 27:
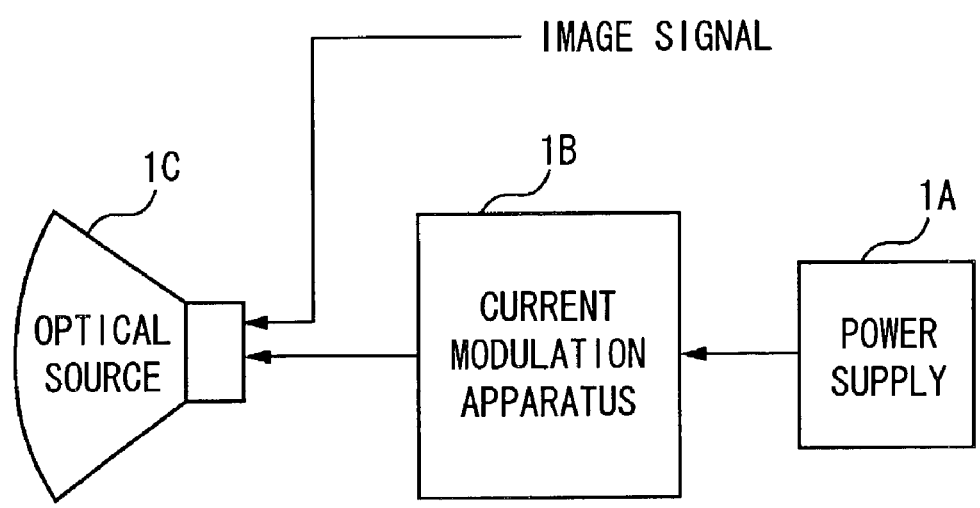
FIG. 27 shows a configuration example of a direct view system (of an optical source modulation type)

FIG. 27 shows a second specific example of the present system. The configuration in FIG. 27 is the same as the configuration in FIG. 15, except that the screen 4 has been removed. The display apparatus 1 in the present example does not require a projection optical system.

The present system relates to a method of modulating a light being emitted from an optical source in a display apparatus of light emitting type. The display apparatus 1 may be a CRT display, a PDP display, an FED display, an EL display, etc. The display apparatus 1 may also be a head mount display.

The current modulation apparatus 1B in FIG. 27 corresponds to the optical state modulation apparatus of the present specification. While a drive current for the optical source is modulated in FIG. 27, a drive voltage for the optical source may be modulated, instead.

(b-3) Specific Example 3

The present specific example relates to a display apparatus like a DLP display or a PDP display, a light emission from an optical source of which is controlled using the PWM method. As shown in FIG. 16, non-light emitting periods are added to the drive pulses.

(c) Third Configuration Example

An optical state modulation application system that makes an optical state variation, that is independent of an original display image, appear in a recorded image, while keeping a display image directly viewed on a display screen undisturbed, includes the following:

(1) A display apparatus of a direct view type that displays an image on a display screen.

(2) An optical state modulation apparatus that applies an optical intensity modulation having a periodicity in the temporal domain on an original display image by controlling the image signal in the display apparatus.

The present system relates to a method of modulating an image signal for generating the display image.

(c-1) Specific Example 1

FIG. 28 shows a first specific example of the present system. The configuration in FIG. 28 is the same as the configuration in FIG. 17, except that the screen 4 has been removed. The display apparatus 1 in the present system does not require a projection optical system.

The display apparatus 1 may be of a non-light emitting type or of a light-emitting type. The display apparatus 1 may also be a head mount display. While the image signal may be modulated by various methods, an image signal modulation apparatus 8, having a configuration shown in FIG. 18, may be utilized with the method, in which a plurality of identical frames, having different optical states, are to be generated from a single frame and provided as an output during a display period for the single frame. A method of controlling the image signal modulation apparatus 8 is the same method used for the projection system described earlier.

(d) Fourth Configuration Example

An optical state modulation application system that makes an optical state variation, that is independent of an original display image, appear in a recorded image, while keeping a display image directly viewed on a display screen undisturbed, includes the following:

(1) A display apparatus of a direct view type that displays an image on a display screen.

(2) An optical state modulation apparatus that applies an optical intensity modulation having a periodicity in the temporal domain on an original display image by affecting a display light.

The present system relates to a method of modulating the optical state in an optical path between the optical source and the viewer. In this type of display apparatus, the optical intensity modulation is likely to be applied in the optical path between the display screen (the screen on which the display image is shown) and the viewer.

(d-1) Specific Example 1

Figure 29:
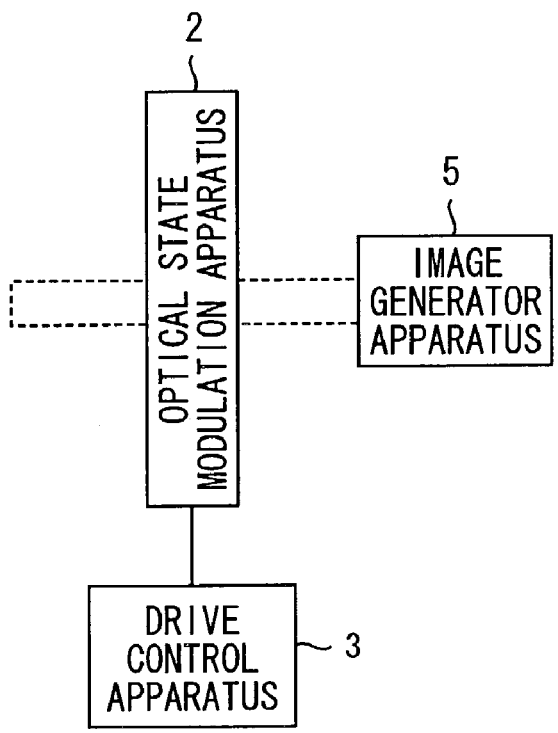
FIG. 29 shows a configuration example of a direct view system (of a display light modulation type)

FIG. 29 shows a first specific example of the present system. The configuration in FIG. 29 is the same as the configuration in FIG. 15, except that the screen 4 and the lens 6 have been removed.

An image generating apparatus 5 may be a CRT display, a liquid crystal display, a PDP display, etc.

The optical state modulation apparatus 2 provides a means of applying optical intensity modulations at different spatial positions on an output light from the image generator apparatus 5 and realizes an optical intensity modulation that satisfies the Condition 1. For this reason, the optical state modulation apparatus 2 must have a configuration for controlling, by increasing or decreasing, the optical state of the output light from the image generating apparatus 5 at each spatial position independently from other spatial positions. The optical state modulation apparatus 2 may be placed at any position between a point of light emission or a surface of light emission and the viewer, as long as the optical state modulation apparatus 2 is able to vary the optical modulation by spatial positions. The optical state modulation apparatus 2 may be realized using various methods.

Figure 30:
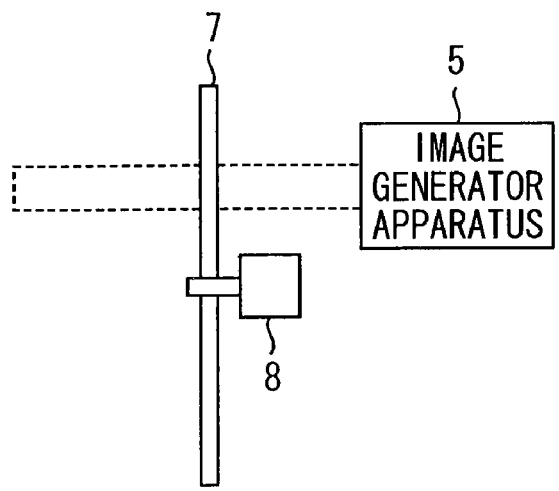
FIG. 30 shows a first configuration example using a rotation density filter in a direct view system (of a display light modulation type)

As shown in FIG. 30, a rotation density filter 7 may be attached on a rotation motor 8 and rotated at a prescribed speed. This method works similarly to the method described in section (d-1) for the projection system in (B-1).

(d-2) Specific Example 2

Figure 31:
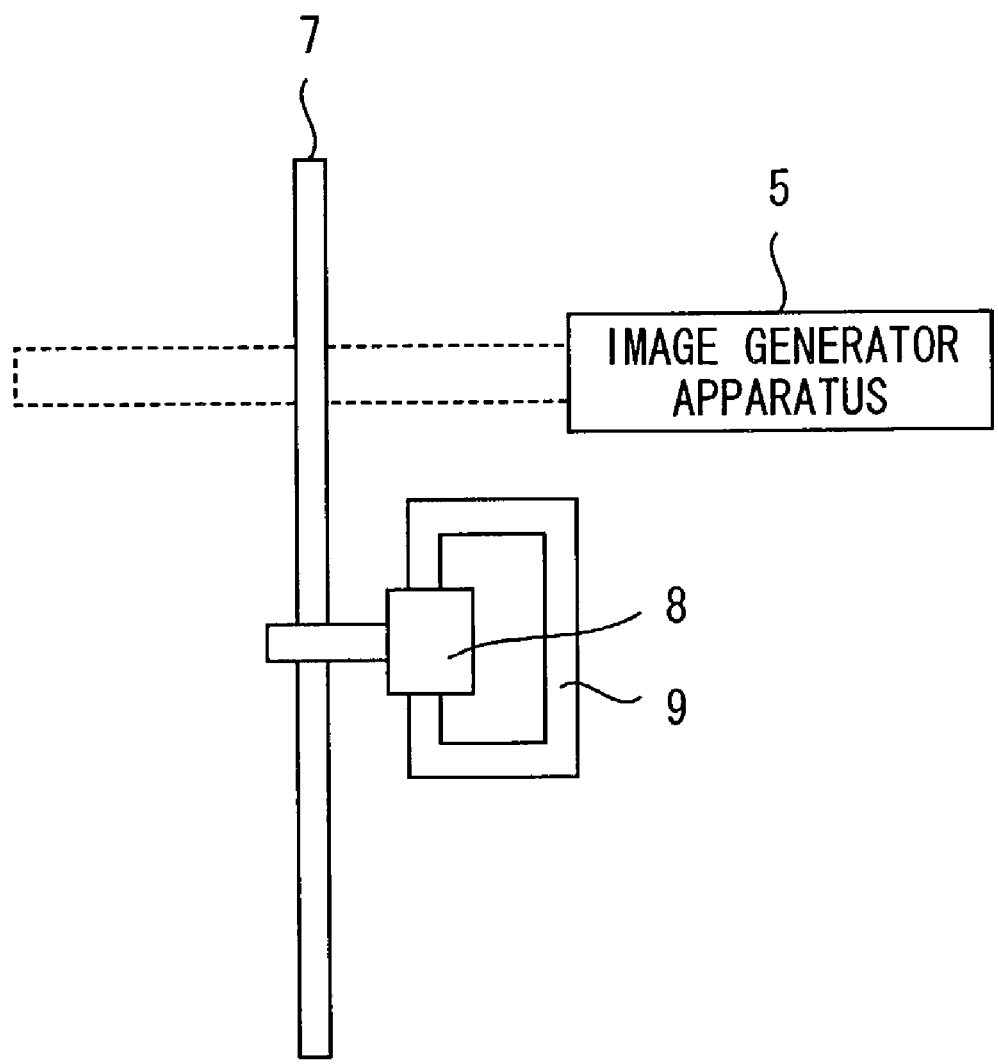
FIG. 31 shows a second configuration example using a rotation density filter in a direct view system (of a display light modulations type).

FIG. 31 shows a variation of the apparatus shown in FIG. 30. The configuration in FIG. 31 is the same as the configuration in FIG. 17, except that the screen 4 and the lens 6 have been removed.

(e) Fifth Embodiment

An optical state modulation application system that makes an optical state variation, that is independent of an original display image, appear in a recorded image, while keeping a display image directly viewed on a display screen undisturbed, includes the following:

(1) A display apparatus of a direct view type that displays an image on a display screen.

(2) An optical state modulation apparatus that applies optical intensity modulations having periodicity in the temporal domain on the original display image at various spatial positions in the image by affecting a display light.

The present system relates to a method of modulating an image signal for generating the display image. The fifth configuration example includes a feature for the optical intensity modulation that satisfies the Condition 1 in addition to the method of modulating the image signal for generating the display image.

(e-1) Specific Example 1

Different methods may be used for applying the optical intensity modulation on the image signal. In the present example, a plurality of subframes having different optical states are generated from a single frame and sent as an output during a display period for the single frame.

The specific example 1 is a direct view version of the projection system in section (e-1) in (B-1).

(e-2) Specific Example 2

The specific example 2 is a variation of the specific example 1 in (e-1). The specific example 2 is a direct view version of the example of the projection system in section (e-2) in (B-1).

(C) Application in Image-capturing Prevention System

In an image-capturing prevention system utilizing the above described optical intensity modulation application system, both the original display image and an optical image pattern (a pattern of the optical state variation), which interferes with the viewing of the recorded image when played back, are displayed with visible lights and, thereby, make it difficult to separately record the original display image and the optical image pattern.

Furthermore, according to the present modulation methods, the original optical state of the display image can be maintained in both color and luminance even after the above described modulation is applied on the original display image.

Furthermore, using to the modulation technologies described above, an effective prevention technology against image/video piracy is realized since the optical image pattern (a pattern of optical state variation) that prevents the viewing of the recorded image is recorded and cannot be separated out.

(D) Application in Electronic Watermarking System

In an electronic watermarking system utilizing the above described optical intensity modulation application system, both the original display image and the optical image pattern (a pattern of the optical state variation), which would be perceptible when a recording of the original display image is displayed, are displayed by using visible light and, thereby, make it difficult to separately record the original display image and the optical image pattern.

Furthermore, with the modulation technologies described above, the original optical state of the display image can be maintained in both color and luminance even after the above described modulation is applied on the original display image.

Furthermore, with the modulation technologies described above, an effective prevention technology against image/video piracy can be realized, since the optical image pattern (the pattern of optical state variation) that can be used as an electronic watermark is inseparably recorded as described above.

As described above, the present invention enables to provide the optical state variation, which is independent of the original display image and does not interfere with a direct viewing of thereof, in the recorded image obtained through image-capturing of the original display image.

What is claimed is:

1. An optical intensity modulation method comprising:
   modulating optical intensity of an original display image in the temporal domain, generating an optical state variation in a recorded image;
   image capturing a display image;
   wherein the optical state variation is independent of the original display image and generates no interfering effect in the display image, when directly viewed, and
   wherein different combinations of amplitude and frequency modulation are applied on different spatial positions in the display image.

2. The optical intensity modulation method according to claim 1,
   wherein the modulation is performed so that a spatial distribution of the optical intensity modulation does not include high spatial frequency components in each time period.

3. The optical intensity modulation method according to claim 1, wherein a phase, an intensity, and a waveform of the modulation in the temporal domain or a combination of the phase, the intensity and the waveforms is varied among various spatial positions, while a frequency is kept constant, to avoid high spatial frequency components in a spatial distribution of the optical intensity modulation in each time period.

4. The optical intensity modulation method according to claim 1,
wherein an optical intensity is modulated in a sinusoidal waveform in the temporal domain, and an amplitude and a frequency of the sinusoidal waveform are such that the amplitude and frequency of a resulting optical intensity modulation over time in each recorded frame, captured by an image capturing apparatus, are that of a region having contrast greater than or equal to a temporal frequency contrast sensitivity threshold of the human vision at a luminance level in the original display image.

5. The optical intensity modulation method according to claim 4,
wherein the amplitude of the sinusoidal waveform is such that the amplitude of the optical intensity modulation is less than or equal to an amplitude value derived from the temporal frequency contrast sensitivity threshold of the human vision at the frequency of the sinusoidal waveform that is defined in claim 4, at a luminance level of the display image.

6. The optical intensity modulation method according to claim 1, further comprising:
modulating the optical state is modulated in a composite waveform, and
at least one combination of amplitudes and frequencies of sinusoidal components of the composite waveform is such that an amplitude and a frequency of the optical state variation in the temporary domain in each recorded frame, captured by an image capturing apparatus, are that of a region having contrast greater than or equal to a temporal frequency contrast sensitivity threshold of the human vision at a luminance level in the original display image.

7. The optical intensity modulation method according to claim 6,
wherein the amplitude of the sinusoidal waveform is such that the amplitude of each sinusoidal component waveform is less than or equal to an amplitude value derived from a temporal frequency contrast sensitivity threshold of the human vision at the frequency of the sinusoidal waveform that is defined in claim 6, at a luminance level of the display image.

8. The optical intensity modulation method according to claim 1, further comprising:
modulating different types of optical intensity at different positions in the display image.

9. The optical intensity modulation method according to claim 1, further comprising:
modulating different types of optical intensity at different time periods.

10. The optical intensity modulation method according to claim 1, further comprising:
maintaining an optical volume displayed in a single frame before and after the optical intensity modulation is applied.

11. The optical intensity modulation method according to claim 1,
wherein the optical state variation in the recorded image is in the color domain.

* * * * *